(12) United States Patent
Tsunoda et al.

(10) Patent No.: US 8,153,330 B2
(45) Date of Patent: Apr. 10, 2012

(54) FUEL CELL SEPARATOR STACKED ON AN ELECTROLYTE ELECTRODE ASSEMBLY

(75) Inventors: Tadashi Tsunoda, Nerima-ku (JP);
Ayatoshi Yokokawa, Saitama (JP);
Tomoyoshi Kuroishi, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 716 days.

(21) Appl. No.: 12/302,423

(22) PCT Filed: May 21, 2007

(86) PCT No.: PCT/JP2007/060747
§ 371 (c)(1),
(2), (4) Date: Nov. 25, 2008

(87) PCT Pub. No.: WO2007/142046
PCT Pub. Date: Dec. 13, 2007

(65) Prior Publication Data
US 2009/0181282 A1 Jul. 16, 2009

(30) Foreign Application Priority Data

May 26, 2006 (JP) .............................. 2006-146537
Mar. 22, 2007 (JP) .............................. 2007-075596

(51) Int. Cl.
*H01M 2/08* (2006.01)
*H01M 2/14* (2006.01)
(52) U.S. Cl. ........................................ 429/508; 429/457
(58) Field of Classification Search .................. 429/457, 429/458, 459
See application file for complete search history.

(56) References Cited

U.S. PATENT DOCUMENTS

| | | | | |
|---|---|---|---|---|
| 7,625,657 | B2 * | 12/2009 | Tsunoda et al. | 429/483 |
| 2004/0247987 | A1 | 12/2004 | Izumi et al. | |
| 2005/0136294 | A1 * | 6/2005 | Tsunoda | 429/12 |
| 2005/0136316 | A1 * | 6/2005 | Tsunoda et al. | 429/37 |
| 2005/0136319 | A1 * | 6/2005 | Tsunoda et al. | 429/39 |
| 2006/0134477 | A1 * | 6/2006 | Homma et al. | 429/20 |
| 2007/0269706 | A1 * | 11/2007 | Tsunoda | 429/40 |
| 2008/0003483 | A1 * | 1/2008 | Tsunoda et al. | 429/34 |
| 2008/0096085 | A1 * | 4/2008 | Tsunoda | 429/34 |
| 2008/0096088 | A1 * | 4/2008 | Tsunoda | 429/35 |
| 2009/0004523 | A1 * | 1/2009 | Tsunoda et al. | 429/27 |
| 2009/0023049 | A1 * | 1/2009 | Yamamura et al. | 429/38 |
| 2009/0123799 | A1 * | 5/2009 | Tsunoda | 429/19 |
| 2009/0169973 | A1 * | 7/2009 | Yamamura et al. | 429/38 |

FOREIGN PATENT DOCUMENTS

| | | |
|---|---|---|
| JP | 3-129675 | 6/1991 |
| JP | 2002-8682 | 1/2002 |
| JP | 2005-174884 | 6/2005 |

OTHER PUBLICATIONS

Kotani, T. et al., "Development of High-Efficiency SOFC Module," *2005 Fuel Cell Seminar* (2005).

* cited by examiner

*Primary Examiner* — Hae Moon Hyeon
(74) *Attorney, Agent, or Firm* — Nelson Mullins Riley & Scarborough LLP; Anthony A. Laurentano

(57) ABSTRACT

A fuel cell separator has a sandwiching section. The sandwiching section is connected to a fuel gas manifold through a bridge, and connected to an oxygen-containing gas manifold through a bridge. The circumferential length R of the sandwiching section, the width H of the bridges the length L of the bridges, and the outer diameter D of the manifolds satisfies relationships of $0.03 \leq H/R \leq 0.20$, $0.01 \leq L/R \leq 0.55$, and $0.06 \leq D/R \leq 0.32$.

10 Claims, 37 Drawing Sheets

⇨ OXYGEN-CONTAINING GAS
▨▶ FUEL GAS
▨▶ EXHAUST GAS

→ OXYGEN-CONTAINING GAS
---→ FUEL GAS

FIG. 6

| BRIDGE WIDTH H / SANDWICHING SECTION CIRCUMFERENTIAL LENGTH R (π·D0) | POWER GENERATION OUTPUT | | | SEPARATOR 38 | | |
|---|---|---|---|---|---|---|
| | GAS SUPPLY | GAS DISCHARGE | QUALITY | SEPARATOR FLEXIBILITY | SEPARATOR RIGIDITY | QUALITY |
| ↑ | ○ | × | × | × | ○ | × |
| MAX (20.00%) | ○ | ○ | ○ | ○ | ○ | ○ |
| ~ | ○ | ○ | ○ | ○ | ○ | ○ |
| MIN (3.00%) | ○ | ○ | ○ | ○ | ○ | ○ |
| ↓ | × | ○ | × | ○ | × | × |

FIG. 7

| BRIDGE LENGTH L / SANDWICHING SECTION CIRCUMFERENTIAL LENGTH R ($\pi \cdot D0$) | POWER GENERATION OUTPUT | | | SEPARATOR 38 | | |
|---|---|---|---|---|---|---|
| | GAS SUPPLY | GAS DISCHARGE | QUALITY | SEPARATOR FLEXIBILITY | SEPARATOR RIGIDITY | QUALITY |
| ↑ | × | ○ | × | ○ | × | × |
| MAX (55.00%) | ○ | ○ | ○ | ○ | ○ | ○ |
| ≀ | ○ | ○ | ○ | ○ | ○ | ○ |
| MIN (1.00%) | ○ | ○ | ○ | × | ○ | ○ |
| ↓ | ○ | × | × | × | ○ | × |

FIG. 8

| MANIFOLD OUTER DIAMETER D / SANDWICHING SECTION CIRCUMFERENTIAL LENGTH R (π·D0) | POWER GENERATION OUTPUT | | | SEPARATOR 38 | | |
|---|---|---|---|---|---|---|
| | GAS SUPPLY | GAS DISCHARGE | QUALITY | SEPARATOR FLEXIBILITY | SEPARATOR RIGIDITY | QUALITY |
| ↑ | ○ | × | × | × | ○ | × |
| MAX (32.00%) | ○ | ○ | ○ | ○ | ○ | ○ |
| ~ | ○ | ○ | ○ | ○ | ○ | ○ |
| MIN (6.00%) | ○ | ○ | ○ | ○ | ○ | ○ |
| ↓ | × | ○ | × | ○ | × | × |

← OXYGEN-CONTAINING GAS
← FUEL GAS

FUEL CELL SEPARATOR STACKED ON AN ELECTROLYTE ELECTRODE ASSEMBLY

RELATED APPLICATIONS

This application is a 35 U.S.C. 371 national stage filing of International Application No. PCT/JP2007/060747, filed 21 May 2007, which claims priority to Japan Patent Application No. 2006-146537 filed on 26 May 2006 and Japan Patent Application No. 2007-075596 filed on 22Mar. 2007 in Japan. The contents of the aforementioned applications are hereby incorporated by reference.

TECHNICAL FIELD

The present invention relates to a fuel cell separator stacked on an electrolyte electrode assembly in a stacking direction. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly (unit cell) is interposed between separators (bipolar plates). In use, predetermined numbers of the electrolyte electrode assemblies and the separators are stacked together to form a fuel cell stack.

As this type of the fuel cell, for example, a solid oxide fuel cell as disclosed in Japanese Laid-Open Patent Publication No. 3-129675 (hereinafter referred to as the first conventional example) is known. As shown in FIG. 35, the fuel cell is formed by stacking donut shape separators 1 and donut shape unit cells 2 alternately. A fuel gas inlet pipe 3a and an oxygen-containing gas inlet pipe 3b as manifolds extend through the centers of the separators 1 and the unit cells 2. In the outer circumferential portion of the fuel cell, fuel gas exhaust ports 4a and oxygen-containing gas exhaust ports 4b are provided offset from each other at an angle of 90°.

Further, in a solid oxide fuel cell disclosed in Japanese Laid-Open Patent Publication No. 2002-8682 (hereinafter referred to as the second conventional example), as shown in FIG. 36, circular disk shape solid electrolyte plates (not shown) and circular disk shape separators 5 are stacked alternately. In the outer circumferential portion of the separator 5, a fuel gas supply hole 6a and an oxygen-containing gas supply hole 6b are provided offset from each other at an angle of 180°, and a plurality of fuel gas exhaust nozzles 7 and oxygen-containing gas exhaust nozzles (not shown) are provided at predetermined intervals in the circumferential direction.

In the surface of the separator 5, seven recesses 8 are provided, and annular fuel gas pipes 9 connecting the seven recesses 8 are provided. The pipes 9 and the fuel gas supply holes 6a are connected to each other. In the surface of the separator 5, spiral fuel gas grooves 10 are provided around the recesses 8.

Further, in a stack unit assembly disclosed in 2005 Fuel Cell Seminar. Nov. 14-18, 2005. Palm Springs, Calif. "Development of High-Efficiency SOFC Module" (hereinafter referred to as the third conventional example), as shown in FIG. 37, a square separator 12 is provided. The separator 12 includes three plates 14a, 14b, and 14c. A fuel manifold 15a and an air manifold 15b extend through the separator 12 at diagonal positions. The fuel manifold 15a and the air manifold 15b are provided at ends of flexible arms 16a, 16b where slits are formed.

A fuel channel 17a and an air channel 17b are provided spirally on the plate 14b. A fuel outlet 18a connected to the fuel channel 17a is provided on the plate 14a, and an air outlet 18b connected to the air channel 17b is provided on the plate 14c.

However, in the first conventional example, the fuel gas exhaust ports 4a and the oxygen-containing gas exhaust ports 4b are provided in the outer circumferential portion of the fuel cell, and the fuel gas and the oxygen-containing gas after reaction (hereinafter also referred to as the exhaust gas) are only discharged from the fuel gas exhaust ports 4a and the oxygen-containing gas exhaust ports 4b. In the structure, the exhaust gas from the unit cells 2 may be discharged non-uniformly or locally, or filled or stayed in local spots. Therefore, power generation is not performed efficiently, and the power generation output by the unit cells 2 may be lowered undesirably.

Further, the fuel gas inlet pipe 3a and the oxygen-containing gas inlet pipe 3b as the manifolds are provided integrally with the separators 1 at positions near the central axis of the separators 1. In the structure, when a tightening load is applied to the unit cells 2 and the separators 1 in the stacking direction to achieve the desired sealing performance of the fuel gas and the oxygen-containing gas, the unit cells 2 may be damaged undesirably by the excessive stress due to the tightening load.

Further, in the second conventional example, the fuel gas (exhaust gas) after reaction is only discharged from the fuel gas exhaust nozzles 7 provided in the outer circumferential portion of the separators 5. In the structure, the exhaust gas from the separators 5 may be discharged non-uniformly or locally, or filled or stayed in local spots. Therefore, power generation is not performed efficiently, and the power generation output by the unit cells may be lowered undesirably. Further, in the structure, when a tightening load is applied to the unit cells and the separators 5 in the stacking direction to achieve the desired sealing performance for preventing the leakage of the fuel gas and the oxygen-containing gas, the unit cells may be damaged undesirably by the excessive stress due to the tightening load.

Further, in the third conventional example, the flexible arms 16a, 16b having slits in the outer circumferential portion of the separator 12 are provided. The fuel manifold 15a and the air manifold 15b are connected to the spiral fuel channel 17a and air channel 17b. In the structure, when a tightening load is applied to the separator 12 in the stacking direction to achieve the desired sealing performance for preventing the leakage of the fuel and the air, the flow of the exhaust gas from the outer circumferential portion of the electrolyte electrode assembly is prevented by the flexible arms 16a, 16b. Thus, exhaust gas is discharged non-uniformly or locally, or filled or stayed in local spots. Therefore, power generation is not performed efficiently, and the power generation output is lowered undesirably.

Further, the separator 12 has a square shape, and the electrolyte electrode assembly has a circular shape. Thus, the area occupied by the separator 12 is large relative to the reaction area of the electrolyte electrode assembly. Therefore, the electricity collection efficiency per unit area and the space efficiency are low.

DISCLOSURE OF INVENTION

The present invention has been made to solve the above problems, and an object of the present invention is to provide a fuel cell separator in which the desired sealing performance is achieved, and an exhaust gas is discharged smoothly and reliably.

The present invention relates to a fuel cell separator stacked on an electrolyte electrode assembly in a stacking direction. The electrolyte electrode assembly includes an anode, a cathode, and an electrolyte interposed between the anode and the cathode.

The separator has a sandwiching section for sandwiching the electrolyte electrode assembly, a bridge connected to the sandwiching section, and a manifold connected to the bridge. A fuel gas channel for supplying a fuel gas along an electrode surface of the anode and an oxygen-containing gas channel for supplying an oxygen-containing gas along an electrode surface of the cathode are provided separately on the sandwiching section. The sandwiching section is configured such that the fuel gas and the oxygen-containing gas after consumption are discharged from an outer circumferential portion of the electrolyte electrode assembly. A reactant gas supply channel for supplying the fuel gas to the fuel gas channel or supplying the oxygen-containing gas to the oxygen-containing gas channel is provided on the bridge. A reactant gas supply passage for supplying the fuel gas or the oxygen-containing gas to the reactant gas supply channel extends through the manifold in the stacking direction.

According to the present invention, the circumferential length R of the sandwiching section and the width H of the bridge satisfy a relationship of $0.03 \leq H/R \leq 0.20$.

Further, according to the present invention, the circumferential length R of the sandwiching section and the length of L of the bridge satisfy a relationship of $0.01 \leq L/R \leq 0.55$.

Further, according to the present invention, the circumferential length R of the sandwiching section and the outer diameter D of the manifold satisfy a relationship of $0.06 \leq D/R \leq 0.32$.

According to the present invention, the circumferential length R of the sandwiching section and the width H of the bridge satisfy the relationship of $0.03 \leq H/R \leq 0.20$. Therefore, the exhaust gas from the outer circumferential portion of the electrolyte electrode assembly is discharged smoothly and reliably, and the desired power generation output is obtained.

Further, according to the present invention, the circumferential length R of the sandwiching section and the length of L of the bridge satisfy the relationship of $0.01 \leq L/R \leq 0.55$. Therefore, the exhaust gas from the outer circumference portion of the electrolyte electrode assembly is discharged smoothly and reliably, and the desired power generation output is obtained.

Further, according to the present invention, the circumferential length R of the sandwiching section and the outer diameter D of the manifold satisfy the relationship of $0.06 \leq D/R \leq 0.32$. Therefore, the exhaust gas from the outer circumferential portion of the electrolyte electrode assembly is discharged smoothly and reliably, and the desired power generation output is obtained.

BRIEF DESCRIPTION OF DRAWINGS

FIG. 6 is a table showing the power generation output and the quality of the separator based on the relationship between the circumferential length of a sandwiching section and the width of a bridge;

FIG. 7 is a table showing the power generation output and the quality of the separator based on the circumferential length of the sandwiching section and the length of the bridge;

FIG. 8 is a table showing the power generation output and the quality of the separator based on the relationship between the circumferential length of the sandwiching section and the outer diameter and a manifold;

BEST MODE FOR CARRYING OUT THE INVENTION

Figure 1:
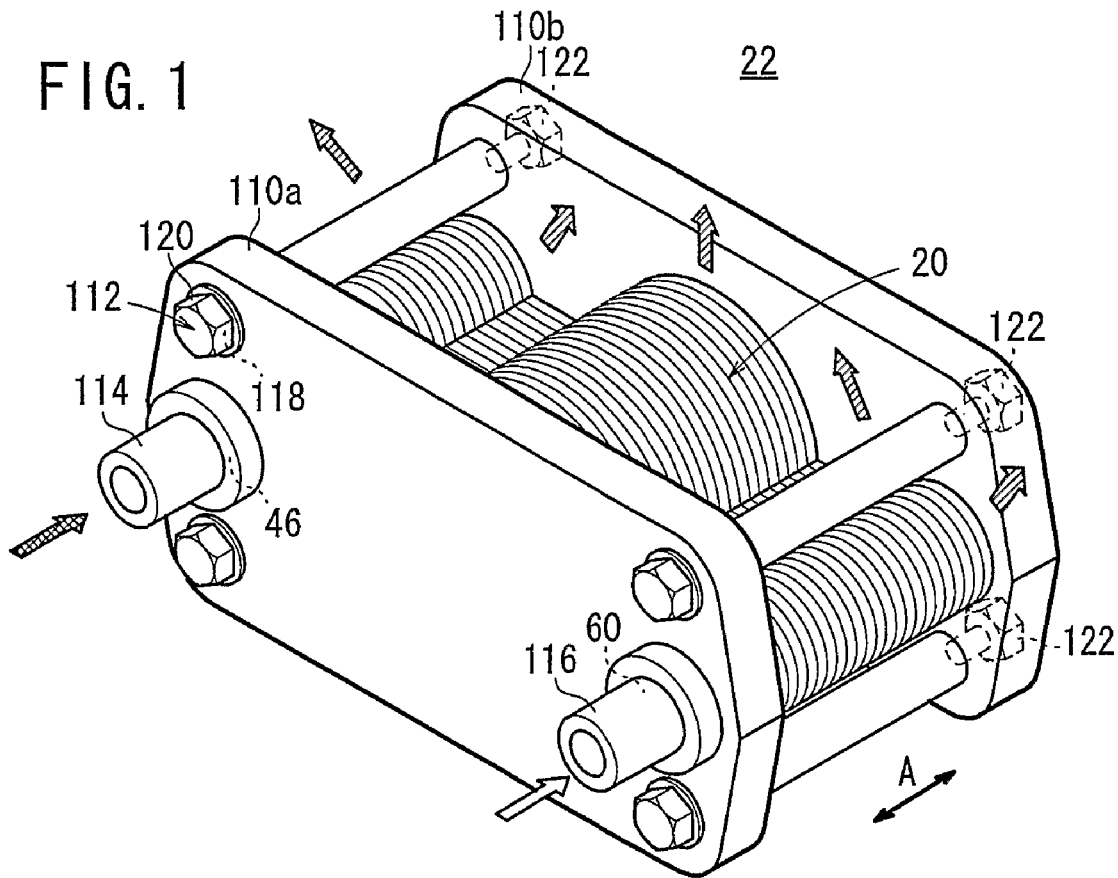
FIG. 1 is a perspective view showing a fuel cell stack formed by stacking a plurality of fuel cells each including a fuel cell separator according to a first embodiment of the present invention.

FIG. 1 is a perspective view schematically showing a fuel cell stack 22 formed by stacking a plurality of fuel cells 20 each including a fuel cell separator according to a first embodiment of the present invention in a direction indicated by an arrow A.

Figure 2:
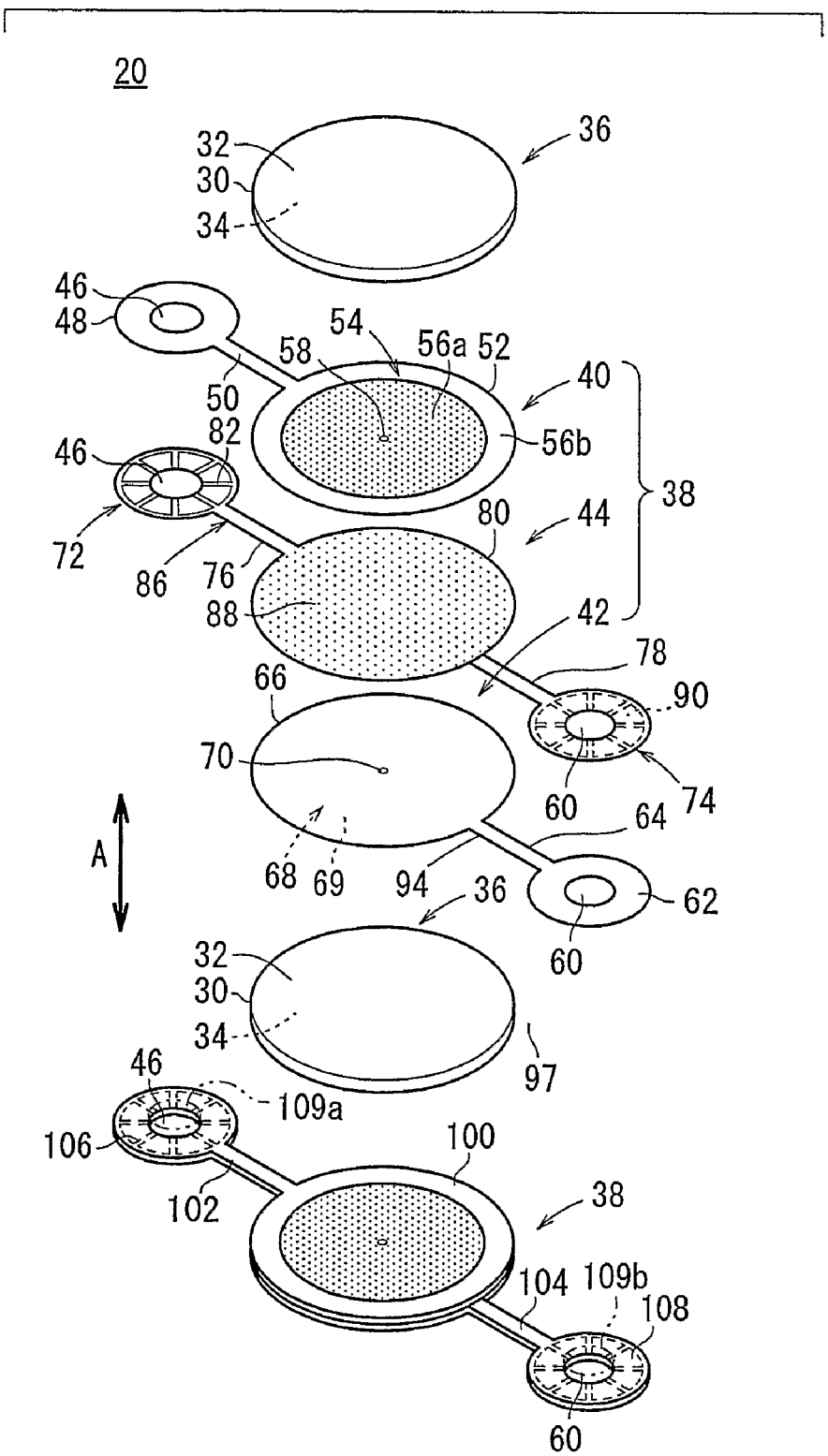
FIG. 2 is an exploded perspective view showing the fuel cell.
Figure 3:
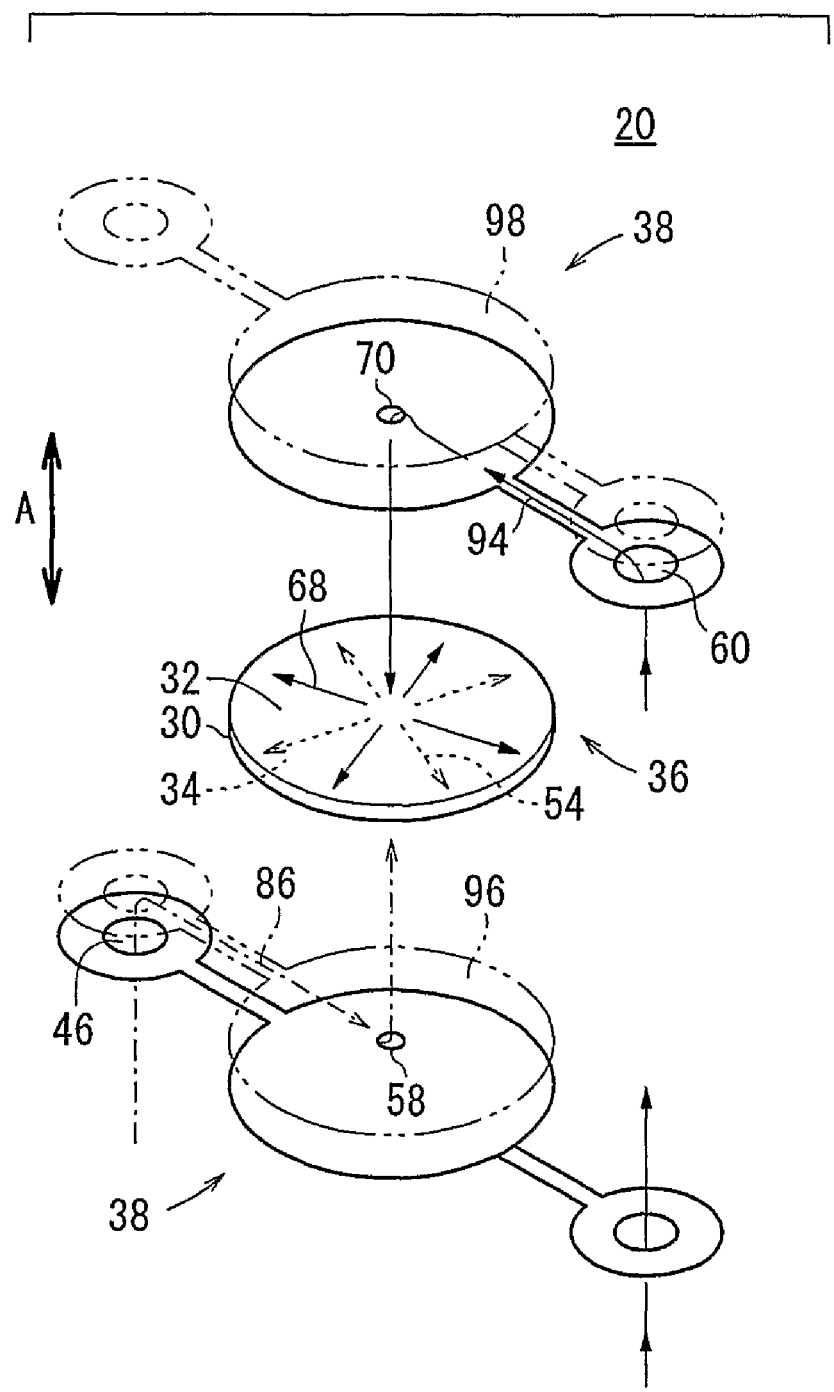
FIG. 3 is a partial exploded perspective view showing gas flows in the fuel cell.

The fuel cell 20 is a solid oxide fuel cell (SOFC), and used in various applications, including stationary and mobile applications. As shown in FIGS. 2 and 3, the fuel cell 20 includes an electrolyte electrode assembly 36. The electrolyte electrode assembly 36 includes a cathode 32, an anode 34, and an electrolyte (electrolyte plate) 30 interposed between the cathode 32 and the anode 34. For example, the electrolyte 30 is made of ion-conductive solid oxide such as stabilized zirconia. The electrolyte electrode assembly 36 has a circular disk shape.

The fuel cell 20 is formed by sandwiching the electrolyte electrode assembly 36 between a pair of separators 38. As shown in FIG. 2, the separator 38 includes first and second plates 40, 42, and a third plate 44 interposed between the first and second plates 40, 42. For example, the first to third plates 40, 42, 44 are metal plates of, e.g., stainless alloy. The first plate 40 and the second plate 42 are joined to both surfaces of the third plate 44 by brazing, for example.

The first plate 40 has a first small diameter end portion 48. A fuel gas supply passage 46 for supplying a fuel gas in the direction indicated by the arrow A extends through the first small diameter end portion 48. The first small diameter end portion 48 is integral with a first circular disk 52 having a relatively large diameter through a narrow first plate section 50. The size of the first circular disk 52 and the size of the anode 34 of the electrolyte electrode assembly 36 are substantially the same.

A large number of first protrusions 56a are formed on a surface of the first circular disk 52 which contacts the anode 34, in a central region adjacent to an outer circumferential region. A substantially ring shaped protrusion 56b is provided on the outer circumferential region of the first circular disk 52. The first protrusions 56a and the substantially ring shaped protrusion 56b jointly function as a current collector. A fuel gas inlet 58 is provided at the center of the first circular disk 52 for supplying the fuel gas toward substantially the central region of the anode 34. The first protrusions 56a may be formed by making a plurality of recesses in a surface which is in the same plane with the surface of the substantially ring shaped protrusion 56b.

The second plate 42 has a second small diameter portion 62. An oxygen-containing gas supply passage 60 for supplying an oxygen-containing gas in the direction indicated by the arrow A extends through the second small diameter end portion 62. The second small diameter end portion 62 is integral with a second circular disk 66 having a relatively large diameter through a narrow second plate section 64.

A plurality of second protrusions 69 are formed on the entire surface of the second circular disk 66 which contacts the cathode 32 of the electrolyte electrode assembly 36. The second protrusions 69 form the oxygen-containing gas channel 68. The second protrusions 69 function as a current collector. An oxygen-containing gas inlet 70 is provided at the center of the second circular disk 66 for supplying the oxygen-gen-containing gas toward substantially the central region of the cathode 32.

The third plate 44 includes a third small diameter end portion 72 and a fourth small diameter end portion 74. The fuel gas supply passage 46 extends through the third small diameter end portion 72, and the oxygen-containing gas supply passage 60 extends through the fourth small diameter end portion 74. The third and fourth small diameter end portions 72, 74 are integral with a third circular disk 80 having a relatively large diameter through first and second narrow plate sections 76, 78, respectively. The first to third circular disks 52, 66, 80 have the same diameter.

The third plate 44 has a plurality of slit channels 82 radially formed in the third small diameter end portion 72, on a surface facing the first plate 40. The slit channels 82 are connected to the fuel gas supply passage 46. A fuel gas supply channel 86 is formed in the first plate section 76 and in the surface of the third circular disk 80. The fuel gas flows from the fuel gas supply passage 46 to the fuel gas supply channel 86 through the slit channels 82. A plurality of third protrusions 88 are formed on the third circular disk 80, and the third protrusions 88 are part of the fuel gas supply channel 86.

The third plate 44 has a plurality of slit channels 90 radially formed in the fourth small diameter end portion 74, on a surface which contacts the second plate 42. The slit channels 90 are connected to the oxygen-containing gas supply passage 60. An oxygen-containing gas supply channel 94 is formed in the third circular disk 80. The oxygen-containing gas flows from the oxygen-containing gas supply passage 60 through the slit channels 90 into the third circular disk 80. The oxygen-containing gas supply channel 94 is closed by the outer circumferential edge of the third circular disk 80.

The first plate 40 is joined to one surface of the third plate 44 by brazing to form the fuel gas supply channel 86 connected to the fuel gas supply passage 46 between the first and third plates 40, 44. The fuel gas supply channel 86 is provided between the first and third circular disks 52, 80, over the electrode surface of the anode 34. The first circular disk 52 is provided between the fuel gas supply channel 86 and the anode 34, and the fuel gas is supplied to the fuel gas supply channel 86. That is, a fuel gas pressure chamber 96 is formed such that the first circular disk 52 tightly contacts the anode 34 under pressure (see FIG. 4). An exhaust gas channel 97 for discharging the fuel gas and oxygen-containing gas after consumption is formed around the electrolyte electrode assembly 36.

The second plate 42 is joined to the third plate 44 by brazing to form the oxygen-containing gas supply channel 94 connected to the oxygen-containing gas supply passage 60 between the second and third plates 42, 44. The oxygen-containing gas supply channel 94 is provided between the second and third circular disks 66, 80, over the electrode surface of the cathode 32. The second circular disk 66 is provided between the oxygen-containing gas supply channel 94 and the cathode 32, and the oxygen-containing gas is supplied to the oxygen-containing gas supply channel 94. That is, an oxygen-containing gas pressure chamber 98 is formed such that the second circular disk 66 tightly contacts the cathode 32 under pressure (see FIG. 4).

The separator 38 has a circular sandwiching section 100 formed by joining the first circular disk 52 of the first plate 40, the second circular disk 66 of the second plate 42, and the third circular disk 80 of the third plate 44. The sandwiching section 100 has a circular disk shape, and is connected to bridges 102 and 104. The bridge 102 is formed by joining the first plate sections 50, 76, and the bridge 104 is formed by joining the second plate sections 64, 78.

The bridge 102 is connected to a fuel gas manifold 106 formed by joining the first small diameter end portion 48 and the third small diameter end portion 72. The bridge 104 is connected to an oxygen-containing gas manifold 108 formed by joining the second small diameter end portion 62 and the fourth small diameter end portion 74.

Figure 5:
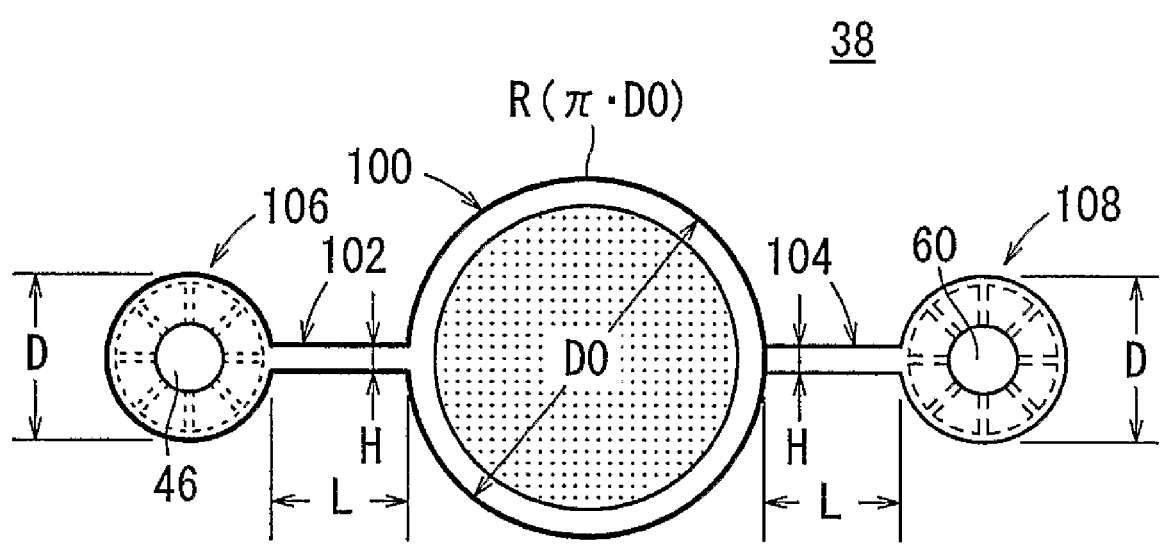
FIG. 5 is a view showing the separator.

As shown in FIG. 5, the separator 38 is dimensioned such that the circumferential length R (π·D0) of the sandwiching section 100 and the width H of the bridges 102, 104 satisfy the following relationship.

$$0.03 \leq H/R \leq 0.20$$

Further, the circumferential length R of the sandwiching section 100 and the length L of the bridges 102, 104 satisfy the following relationship.

$$0.01 \leq L/R \leq 0.55$$

Further, the circumferential length of the sandwiching section 100 and the outer diameter D of the manifolds 106, 108 satisfy the following relationship.

$$0.06 \leq D/R \leq 0.32$$

Insulating seals 109a for sealing the fuel gas supply passage 46 and insulating seals 109b for sealing the oxygen-containing gas supply passage 60 are provided between the separators 38. For example, the insulating seals 109a, 109b are made of mica material, or ceramic material.

As shown in FIG. 1, the fuel cell stack 22 includes a plurality of fuel cells 20 stacked together, and end plates 110a, 110b provided at opposite ends in the stacking direction. The end plate 110a or the end plate 110b is electrically insulated from tightening means 112. A first pipe 114 and a second pipe 116 extend through the end plate 110a. The first pipe 114 is connected to the fuel gas supply passage 46, and the second pipe 116 is connected to the oxygen-containing gas supply passage 60. The tightening means 112 for tightening components between the end plates 110a, 110b is provided at positions near the fuel gas supply passage 46 and the oxygen-containing gas supply passage 60, and away from the electrolyte electrode assemblies 36. The tightening means 112 applies a tightening load to the electrolyte electrode assemblies 36 and the separators 38 stacked in the direction indicated by the arrow A.

The tightening means 112 includes bolt holes 118 formed in the end plates 110a, 110b on both sides of the fuel gas supply passage 46 and on both sides of the oxygen-containing gas supply passage 60. Tightening bolts 120 are inserted into the respective bolt holes 118, and tip ends of the respective tightening bolts 120 are screwed into nuts 122 for tightening the fuel cell stack 22. The sandwiching section 100 is connected to the manifolds 106, 108 through the bridges 102, 104. When a tightening load for sealing is applied by the tightening means 112 to positions near the manifolds 106, 108, no excessive load is applied to the electrolyte electrode assemblies 36 sandwiched between the adjacent sandwiching sections 100.

Next, operation of the fuel cell stack 22 will be described below.

In FIG. 1, the fuel gas (e.g., hydrogen-containing gas) is supplied to the first pipe 114 connected to the end plate 110a, and flows from the first pipe 114 to the fuel gas supply passage 46. The oxygen-containing gas (hereinafter also referred to as the "air") is supplied to the second pipe 116 connected to the end plate 110a, and the oxygen-containing gas flows from the second pipe 116 to the oxygen-containing gas supply passage 60.

Figure 4:
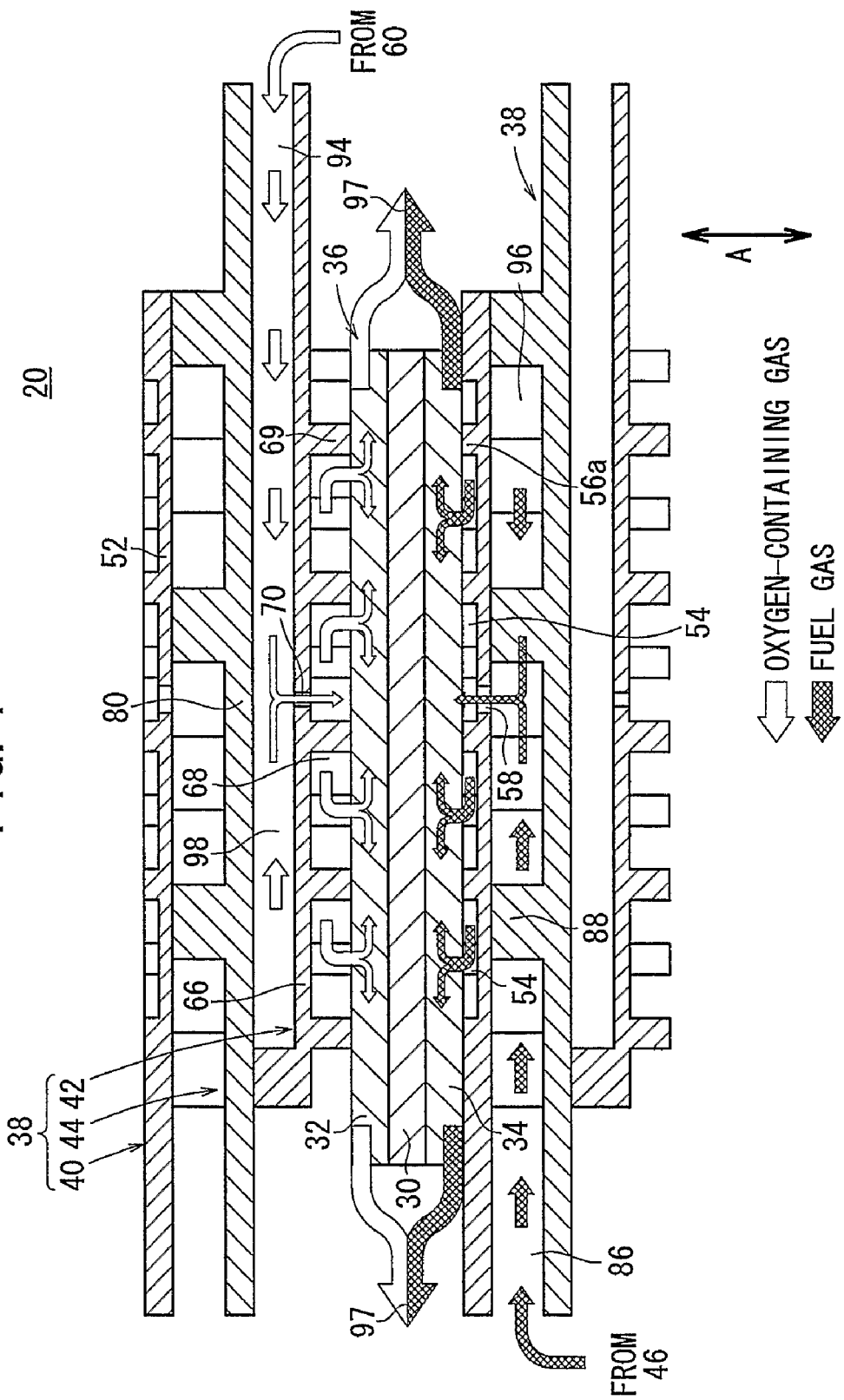
FIG. 4 is a cross sectional view schematically showing operation of the fuel cell.

As shown in FIG. 4, after the fuel gas flows into the fuel gas supply passage 46, the fuel gas flows in the stacking direction indicated by the arrow A, and is supplied to the fuel gas supply channel 86 in the separator 38 of each of the fuel cells 20. The fuel gas flows along the fuel gas supply channel 86, and flows into the fuel gas pressure chamber 96 between the first and third circular disks 52, 80. The fuel gas flows between the third protrusions 88, and flows into the fuel gas inlet 58 at the central position of the first circular disk 52.

The fuel gas inlet 58 is provided at a position corresponding to the central position of the anode 34 in each of the electrolyte electrode assemblies 36. Therefore, the fuel gas from the fuel gas inlet 58 is supplied to the fuel gas channel 54, and flows from the central region of the anode 34 toward the outer circumferential region of the anode 34.

After the oxygen-containing gas flows into the oxygen-containing gas supply passage 60, the oxygen-containing gas flows through the oxygen-containing gas supply channel 94 in the separator 38, and is supplied to the oxygen-containing gas pressure chamber 98 between the second and third circular disks 66, 80. The oxygen-containing gas flows into the oxygen-containing gas inlet 70 at the central position of the second circular disk 66.

The oxygen-containing gas inlet 70 is provided at a position corresponding to the central position of the cathode 32 in each of the electrolyte electrode assemblies 36. Therefore, the oxygen-containing gas from the oxygen-containing gas inlet 70 is supplied to the oxygen-containing gas channel 68, and flows from the central region of the cathode 32 to the outer circumferential region of the cathode 32.

Thus, in each of the electrolyte electrode assemblies 36, the fuel gas is supplied from the central region of the anode 34 to the outer circumferential region of the anode 34, and the oxygen-containing gas is supplied from the central region of the cathode 32 to the outer circumferential region of the cathode 32 for generating electricity. The fuel gas and the oxygen-containing gas consumed in power generation are discharged as an exhaust gas from the outer circumferential portions of the sandwiching sections 100.

In the first embodiment, as shown in FIG. 5, the relationship of $0.03 \leq H/R \leq 0.20$ is satisfied by the circumferential length R of the sandwiching section 100 of the separator 38 and the width H of the bridges 102, 104 of the separator 38.

If H/R is greater than 0.20, i.e., if the width H of the bridges 102, 104 is comparatively large relative to the circumferential length R of the sandwiching section 100, the consumed fuel gas and the oxygen-containing gas (hereinafter also referred to as the exhaust gas) discharged from the outer portion of the electrolyte electrode assembly 36 sandwiched between the adjacent sandwiching sections 100 does not flow smoothly due to the disturbance of the bridges 102, 104. Consequently, the exhaust gas may be discharged non-uniformly or locally, or filled or stayed in local spots. Therefore, power generation is not performed efficiently, and the power generation output by the electrolyte electrode assembly 36 may be lowered undesirably.

If H/R is less than 0.03, i.e., if the width H of the bridges 102, 104 is significantly small relative to the circumferential length R of the sandwiching section 100, though the exhaust gas is discharged smoothly, the flow rate of the fuel gas flowing through the fuel gas supply channel 86 and the flow rate of the oxygen-containing gas supplied through the oxygen-containing supply channel 94 are lowered significantly. Consequently, the amounts of the fuel gas and the oxygen-containing gas supplied to the electrolyte electrode assembly 36 become insufficient. Therefore, power generation is not performed efficiently, and the power generation output by the electrolyte electrode assembly 36 may be lowered undesirably.

That is, by satisfying the relationship of $0.03 \leq H/R \leq 0.20$, it is possible to reliably obtain the desired power generation output (see FIG. 6).

Next, the flexibility and rigidity of the separator 38 itself are taken into account. If H/R is greater than 0.20, the width H of the bridges 102, 104 becomes large, and the flexibility is degraded (see FIG. 6). Therefore, in order to maintain the performance of sealing the fuel gas supply passage 46 and the oxygen-containing gas supply passage 60, at the time of applying a tightening load by the tightening means 112, the tightening load applied to the sandwiching section 100 may be excessive undesirably. As a result, the electrolyte electrode assemblies 36 may be damaged undesirably.

If H/R is less than 0.03, the width H of the bridges 102, 104 becomes considerably small. Therefore, the rigidity of the bridges 102, 104 is small. The bridges 102 104 may be damaged undesirably by the excessive stress due to the tightening load. Therefore, in order to maintain the flexibility and rigidity of the separator 38 itself, the relationship of $0.03 \leq H/R \leq 0.20$ needs to be satisfied.

Further, in the first embodiment, the relationship of $0.01 \leq L/R \leq 0.55$ is satisfied by the circumferential length R and the length L of the bridges 102, 104.

If L/R is greater than 0.55, i.e., if the length L of the bridges 102, 104 is significantly large relative to the circumferential length R of the sandwiching section 100, the flow rate of the fuel gas flowing through the fuel gas supply channel 86 and the flow rate of the oxygen-containing gas flowing through the oxygen-containing supply channel 94 are lowered significantly. Consequently, power generation reaction is not performed efficiently, and the power generation output by the electrolyte electrode assembly 36 may be lowered undesirably (see FIG. 7).

If L/R is less than 0.01, i.e., if the sandwiching section 100 is provided near the manifolds 106, 108, the exhaust gas discharged from the outer circumferential portion of the electrolyte electrode assembly 36 does not flow smoothly. Consequently, the exhaust gas may be discharged non-uniformly or locally, or filled or stayed in local spots. Therefore, power generation reaction is not performed efficiently, and the power generation output may be lowered undesirably.

Further, if the length L of the bridges 102, 104 is large, the rigidity of the bridges 102, 104 is lowered, and if the length L of the bridges 102, 104 is small, the flexibility of the bridges 102, 104 is lowered (see FIG. 7). Therefore, by satisfying the relationship of $0.01 \leq L/R \leq 0.55$, the desired power generation output is achieved, and the desired flexibility and rigidity of the separator 38 itself is achieved.

Further, in the first embodiment, the relationship of $0.06 \leq D/R \leq 0.32$ is satisfied by the circumferential length R of the sandwiching section 100 and the outer diameter D of the manifolds 106, 108.

If D/R is greater than 0.32, i.e., if the diameter D of the manifolds 106, 108 is significantly large relative to the circumferential length R of the sandwiching section 100, the exhaust gas discharged from the outer circumferential portion of the electrolyte electrode assembly 36 sandwiched between the adjacent sandwiching sections 100 does not flow smoothly. Consequently, the exhaust gas may be discharged non-uniformly or locally, or filled or stayed in local spots. Therefore, power generation is not performed efficiently, and the power generation output by the electrolyte electrode assembly 36 may be lowered undesirably.

If D/R is less than 0.06, i.e., if the diameter D of the manifolds 106, 108 is significantly small, the desired flow rate of the fuel gas supplied from the manifold 106 and the desired flow rate of the oxygen-containing gas supplied from the manifold 108 are not maintained. Consequently, power generation reaction is not performed efficiently, and the power generation output by the electrolyte electrode assembly 36 may be lowered undesirably (see FIG. 8).

Further, if D/R is greater than 0.32, the flexibility of the separator 38 is low, and if D/R is less than 0.06, the rigidity of the separator 38 is low. Therefore, by satisfying the relationship of $0.06 \leq D/R \leq 0.32$, the desired power generation output is achieved, and the desired flexibility and rigidity of the separator 38 itself are achieved.

In the first embodiment, the sandwiching section 100 has a circular disk shape which is substantially identical to the shape of the electrolyte electrode assembly 36. The area occupied by the sandwiching section 100 is small in comparison with the reaction area of the electrolyte electrode assembly 36. Thus, the current collection efficiency and the space efficiency per unit area are improved.

Further, the bridges 102, 104 connecting the sandwiching section 100 and the manifolds 106, 108 are arranged in a straight line. Therefore, the fuel gas and the oxygen-containing gas flow smoothly through the fuel gas supply channel 86 and the oxygen-containing gas supply channel 94, and gas clogging is prevented as much as possible. Further, the flow of the exhaust gas discharged from the electrolyte electrode assembly 36 is not disturbed in comparison with the case where curved bridges are adopted.

Figure 9:
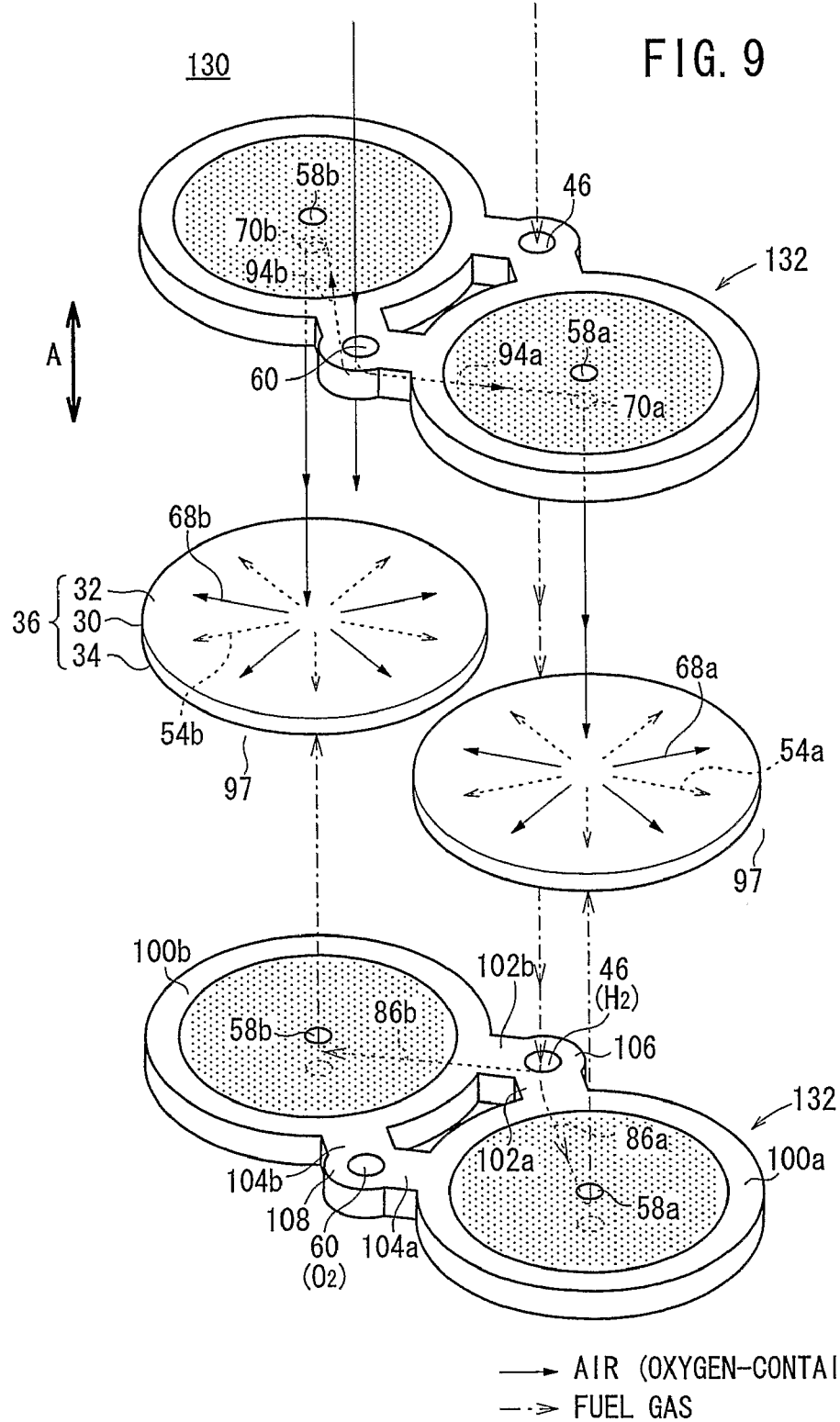
FIG. 9 is a view showing a fuel cell separator according to a second embodiment of the present invention.

FIG. 9 is an exploded perspective view showing a fuel cell 130 including a fuel cell separator according to a second embodiment of the present invention. The constituent elements that are identical to those of the fuel cell 20 according to the first embodiment are labeled with the same reference numerals, and description thereof will be omitted. Further, in third to eighth embodiments as described later, the constituent elements that are identical to those of the fuel cell 20 according to the first embodiment are labeled with the same reference numerals, and description thereof will be omitted.

Figure 10:
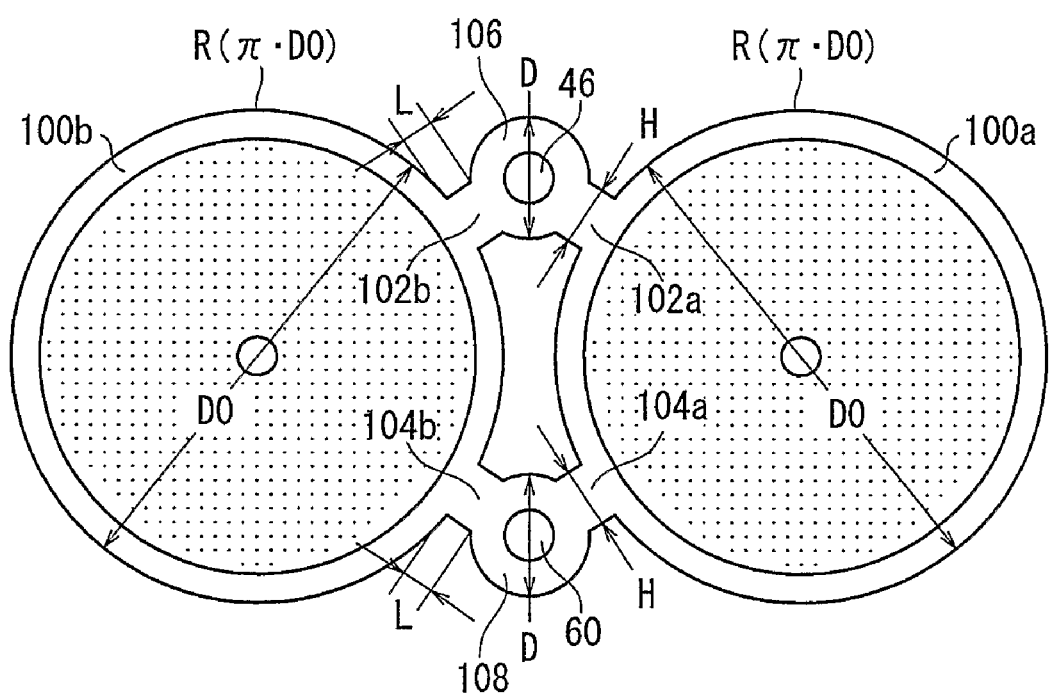
FIG. 10 is a view showing the separator.

The fuel cell 130 includes a pair of separators 132 according to the second embodiment of the present invention. Two electrolyte electrode assemblies 36 are sandwiched between the separators 132. As in the case of the separator 38, the separator 132 is made up of three plates (not shown). As shown in FIGS. 9 and 10, the separator 132 includes a first sandwiching section 100a having a circular disk shape and a second sandwiching section 100b having a circular disk shape for sandwiching the electrolyte electrode assemblies 36, respectively.

The first sandwiching section 100a and the second sandwiching section 100b are connected to a manifold 106 through bridges 102a, 102b. Further, the first sandwiching section 100a and the second sandwiching section 100b are connected to a manifold 108 through bridges 104a, 104b. Fuel gas supply channels 86a, 86b are formed in the bridges 102a, 102b, and oxygen-containing gas supply channels 94a, 94b are formed in the bridges 104a, 104b.

A fuel gas channel 54a and an oxygen-containing gas channel 68a are formed between the first sandwiching section 10a and the electrolyte electrode assembly 36, and a fuel gas channel 54b and an oxygen-containing gas channel 68b are formed between the second sandwiching section 100b and the electrolyte electrode assembly 36.

As shown in FIG. 10, the relationship of $0.03 \leq H/R \leq 0.20$ is satisfied by the circumferential length R of the first sandwiching section 100*a* and the second switching section 100*b* and the width H of the bridges 102*a*, 102*b* and the bridges 104*a*, 104*b*.

The relationship of 0.01≦L/R≦0.55 is satisfied by the circumferential length R of the first sandwiching section 100*a* and the second switching section 100*b* and the length L of the bridges 102*a*, 102*b* and the bridges 104*a*, 104*b*.

The relationship of 0.06≦D/R≦0.32 is satisfied by the circumferential length R of the first sandwiching section 100*a* and the second switching section 100*b* and the outer diameter D of the manifolds 106, 108.

In the second embodiment, the same advantages as in the case of the first embodiment can be obtained. The separators 132 sandwich the two electrolyte electrode assemblies 36. All of the fuel gas supply channel 86*a*, 86*b* for supplying the fuel gas to the electrolyte electrode assemblies 36 and the oxygen-containing gas supply channels 94*a*, 94*b* for supplying the oxygen-containing gas to the electrolyte electrode assemblies 36 have the same length. In the structure, the fuel gas and the oxygen-containing gas are distributed equally to each of the electrolyte electrode assemblies 36, and the power generation output is increased in each of the electrolyte electrode assemblies 36.

Figure 11:
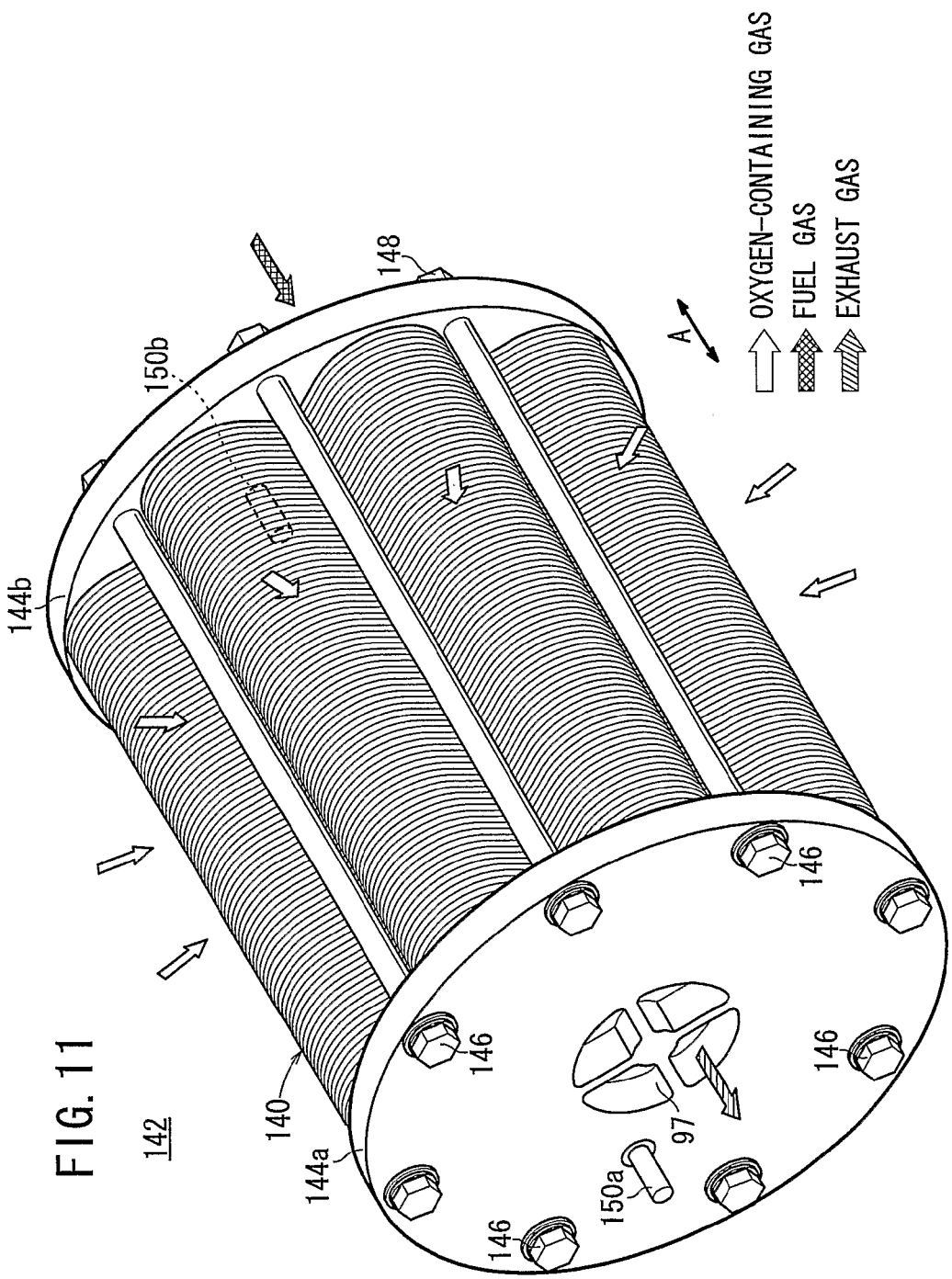
FIG. 11 is a perspective view schematically showing a fuel cell stack formed by stacking a plurality of fuel cells each including a fuel cell separator according to a third embodiment of the present invention.

FIG. 11 is a perspective view schematically showing a fuel cell stack 142 formed by stacking a plurality of fuel cells 140 each including a fuel cell separator according to a third embodiment of the present invention.

The fuel cell stack 142 is formed by stacking a plurality of fuel cells 140 in a direction indicated by the arrow A. Each of the fuel cells 140 has a circular disk shape having an outer curved section. End plates 144*a*, 144*b* are provided at opposite ends of the fuel cells 140 in the stacking direction, and a plurality of, e.g., eight tightening bolts 146 and nuts 148 are used for tightening components between the end plates 144*a*, 144*b*.

Figure 12:
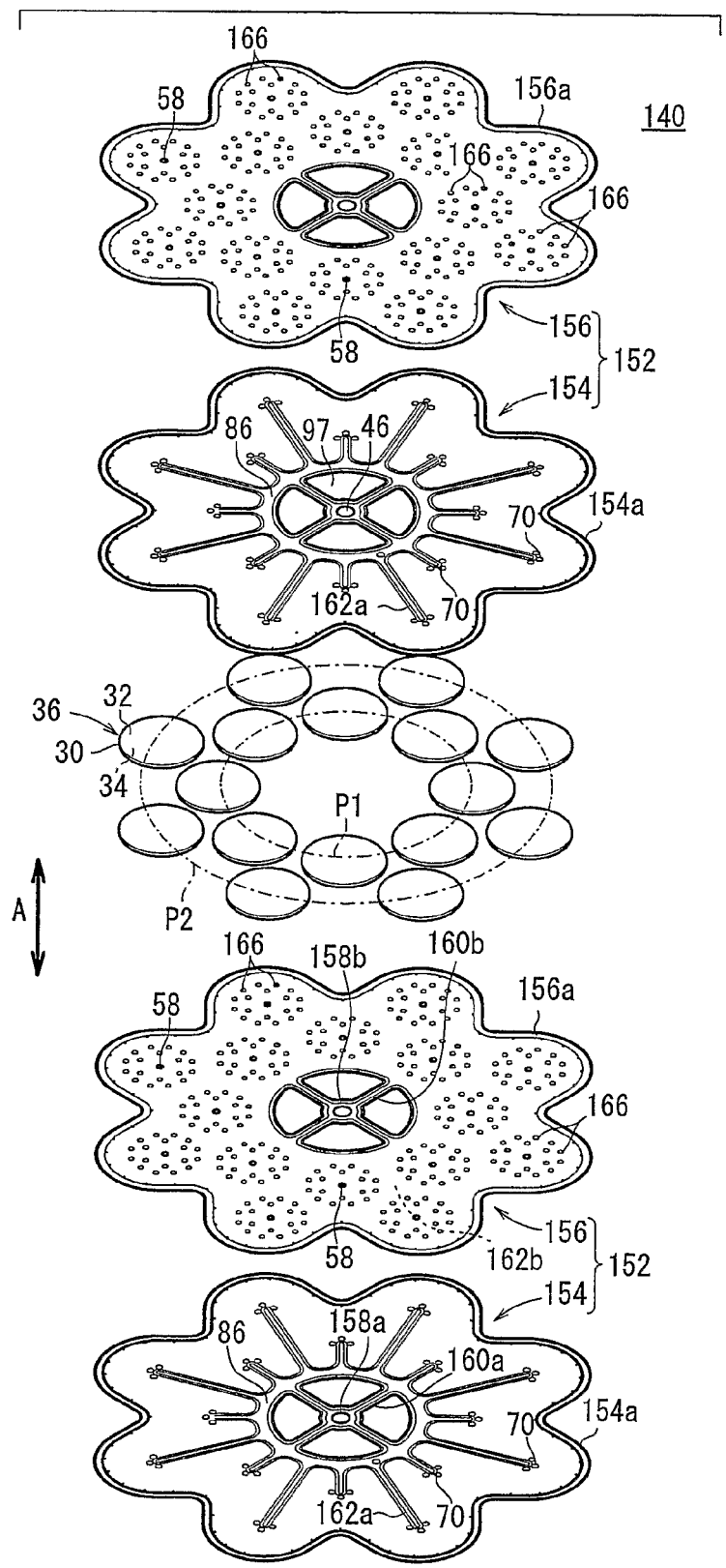
FIG. 12 is an exploded perspective view showing the fuel cell.
Figure 13:
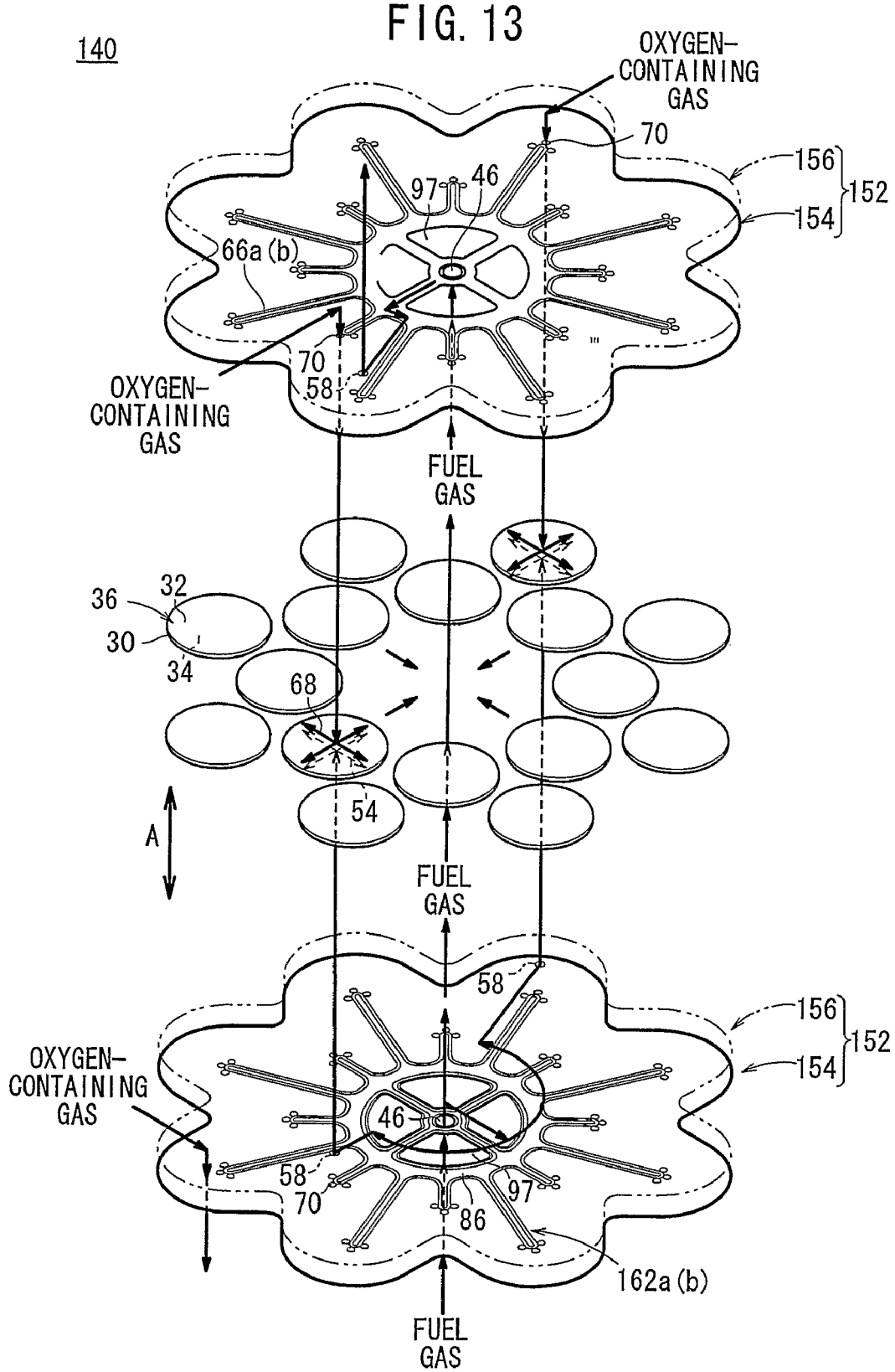
FIG. 13 is a partial exploded perspective view showing gas flows in the fuel cell.

A circular fuel gas supply passage 46 extends through the center of the fuel cell stack 142 in the direction indicated by the arrow A, and the end plate 144*a* forms the bottom of the fuel gas supply passage 46 (see FIGS. 12 and 13). A plurality of, e.g., four exhaust gas channels 97 extending in the direction indicated by the arrow A are formed around the fuel gas supply passage 46. The end plats 144*b* form the bottoms of the exhaust gas channels 97. Output terminals 150*a*, 150*b* are provided at the end plates 144*a*, 144*b*, respectively (see FIG. 11).

As shown in FIGS. 12 and 13, a plurality of, e.g., sixteen electrolyte electrode assemblies 36 are sandwiched between a pair of separators 152 according to the third embodiment to form the fuel cell 140.

In the surface of the separator 152, eight electrolyte electrode assemblies 36 are arranged in an inner circle P1 concentric with the fuel gas supply passage 46 at the center of the separator 152, and eight electrolyte electrode assemblies 36 are arranged in an outer circle P2 around the inner circle P1 (see FIG. 12).

The separator 152 includes a plurality of, e.g., two plates 154, 156, which are stacked together. For example, plates 154, 156 are made of metal plates of, e.g., stainless alloy. Each of the plates 154, 156 has an outer curved section 154*a*, 156*a*.

Small diameter end portions 158*a*, 158*b* are formed at the centers of the plates 154, 156. A fuel gas supply passage 46 extends through the small diameter end portions 158*a*, 158*b*. For example, four plate sections 160*a*, 160*b* are connected to the small diameter end portions 158*a*, 158*b* to form four exhaust gas channels 97. The plate sections 160*a*, 160*b* are connected to sandwiching sections 174*a*, 174*b* as described later.

Figure 14:
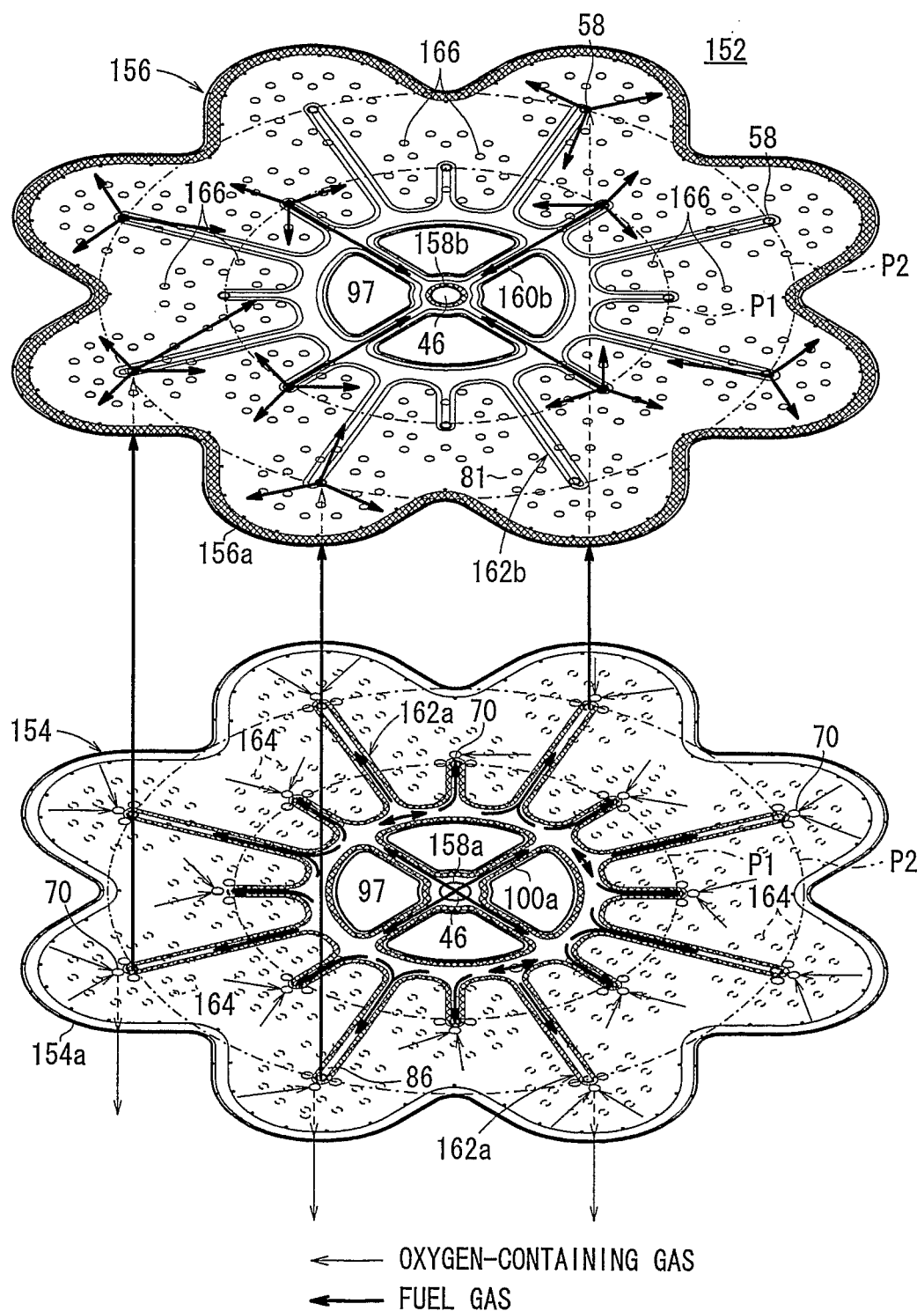
FIG. 14 is an exploded perspective view showing the separator.

As shown in FIGS. 12 and 14, ridges 162*a*, 162*b* extending radially from the fuel gas supply passage 46 are provided on the plates 154, 156. A fuel gas supply channel 86 connected to the fuel gas supply passage 46 is formed between the ridges 162*a*, 162*b*.

As shown in FIG. 14, front ends of the ridges 162*a*, 162*b* are arranged in a virtual circle which matches the inner circle P1 where the inner eight electrolyte electrode assemblies 36 are arranged, and in a virtual circle which matches the outer circle P2 where the outer eight electrolyte electrode assemblies 36 are arranged.

Three oxygen-containing gas inlets 70 pass through the plate 154 at positions around the respective ends of the ridges 162*a*. First bosses 164 are provided on the plate 154. The first bosses 164 expand toward, and contact the electrolyte electrode assemblies 36 arranged along the inner circle P1 and the outer circle P2.

Second bosses 166 are provided on the plate 156. The second bosses 166 expand toward, and contact the electrolyte electrode assemblies 36 arranged along the inner circle P1 and the outer circle P2. The dimensions (height and diameter) of the second boss 166 are small in comparison with the first boss 164 (see FIG. 15). Fuel gas inlets 58 connected to the fuel gas supply channel 86 pass through the plate 156. The fuel gas supply channel 86 connects the fuel gas inlets 58 to the fuel gas channel 54.

The fuel gas supply channel 86 is provided between the ridge 162*a* of the plate 154 and the ridge 162*b* of the plate 156. Further, the oxygen-containing gas supply channel 94 is provided between the plate 154 and the plate 156 outside the ridges 162*a*, 162*b*. The oxygen-containing gas supply channel 94 is connected to the oxygen-containing gas channel 68 through the oxygen-containing gas inlets 70 formed in the plates 154.

Figure 16:
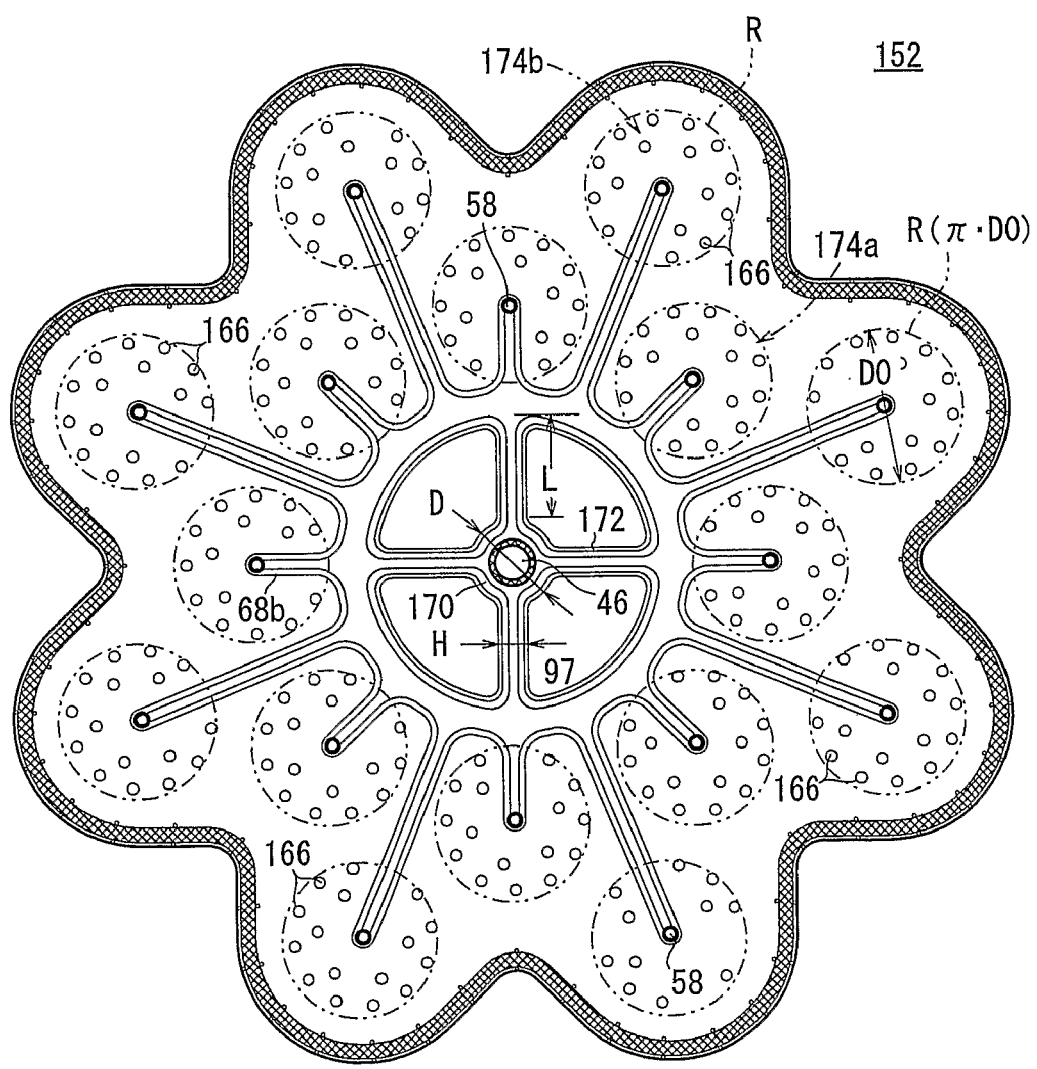
FIG. 16 is a view showing the separator.

As shown in FIG. 16, the separator 152 has a manifold 170 formed by joining the small diameter end portions 158*a*, 158*b*. Further, plate sections 160*a*, 160*b* are joined together to form bridges 172. In the surface of the separator 152, eight sandwiching sections 174*a* for sandwiching the eight electrolyte electrode assemblies 36 arranged along the inner circle P1 and eight sandwiching sections 174*b* arranged along the outer circle P2 are provided.

The relationship of 0.03≦H/R≦0.20 is satisfied by the circumferential length R of the sandwiching sections 174*a*, 174*b* and the width H of the bridges 172.

The relationship of 0.01≦L/R≦0.55 is satisfied by the circumferential length R of the sandwiching sections 174*a*, 174*b* and the length L of the bridges 172.

The relationship of 0.06≦D/R≦0.32 is satisfied by the circumferential length R of the sandwiching sections 174*a*, 174*b* and the outer diameter D of the manifold 170.

Figure 15:
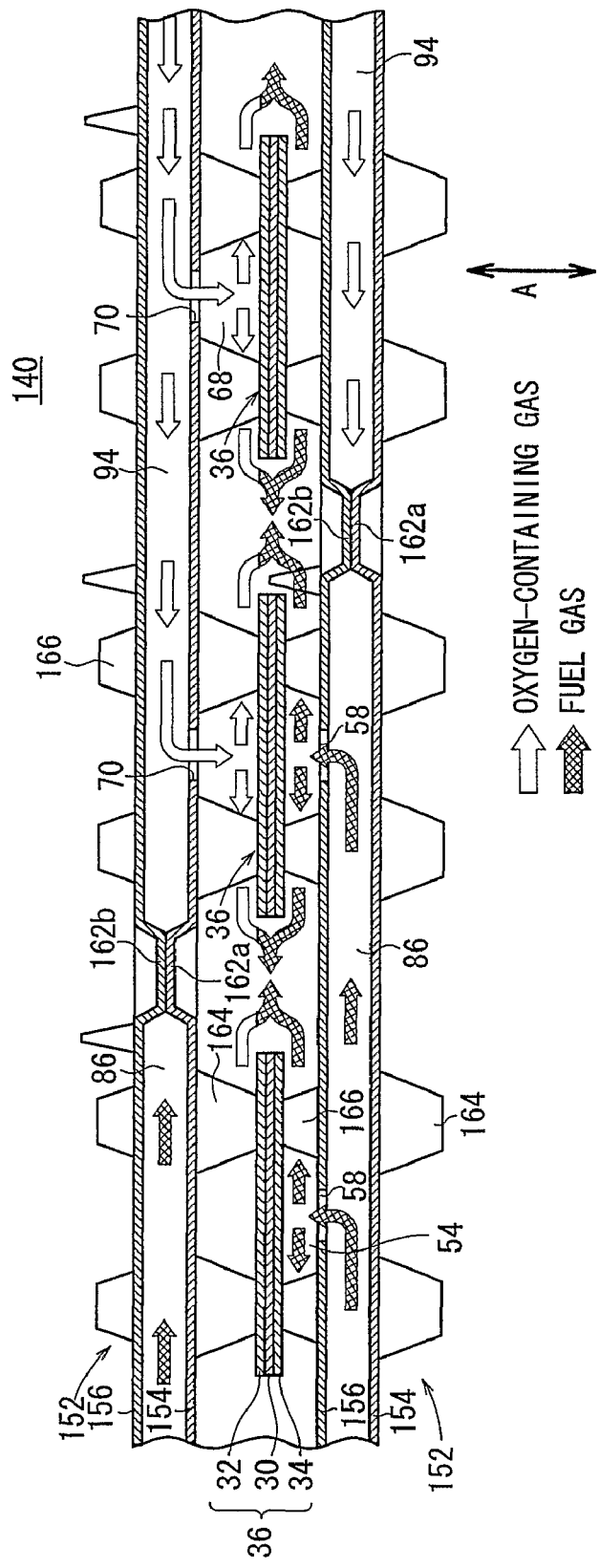
FIG. 15 is a cross sectional view schematically showing operation of the fuel cell.

The electrolyte electrode assemblies 36 are sandwiched between the plate 154 of one of the adjacent separators 152, and the plate 156 of the other of the adjacent separators 152. Specifically, as shown in FIG. 15, first bosses 164 and second bosses 166 are expanded from the plates 154, 156 on both sides of the electrolyte electrode assemblies 36. The electrolyte electrode assemblies 36 are sandwiched between the first bosses 164 and the second bosses 166.

A fuel gas channel 54 is formed between the electrolyte electrode assemblies 36 and the plate 156 of one of the adjacent separators 152. The fuel gas supply channel 86 is connected to the fuel gas channel 54 through the fuel gas inlet 58. An oxygen-containing gas channel 68 is formed between the electrolyte electrode assemblies 36 and the plate 154 of the other of the adjacent separators 152. The oxygen-containing gas supply channel 94 is connected to the oxygen-containing gas channel 68 through the oxygen-containing gas inlets 70.

Next, operation of the fuel cell stack 142 will be described below.

As shown in FIG. 11, a fuel gas is supplied to the fuel gas supply passage 46 from the end plate 144b of the fuel cell stack 142 and an oxygen-containing gas is supplied from the outer circumferential region of the fuel cell stack 142 under pressure. The fuel gas supplied to the fuel gas supply passage 46 flows in the stacking direction indicated by the arrow A, and the fuel gas is supplied into the fuel gas supply channel 86 in the separator 152 of each fuel cell 140 (see FIG. 13).

As shown in FIGS. 13 and 15, the fuel gas flows along the fuel gas supply channel 86 formed between the ridges 162a, 162b, and the fuel gas is supplied into the fuel gas channel 54 through the fuel gas inlets 58. The fuel gas inlets 58 are provided at positions corresponding to the centers of the anodes 34 of the respective electrolyte electrode assemblies 36. In the fuel gas channel 54, the fuel gas flows outwardly from the center of the anode 34 of each of the electrolyte electrode assemblies 36.

The oxygen-containing gas supplied from the outside of the fuel cells 140 flows into the oxygen-containing gas supply channel 94 formed between the plates 154, 156 of the respective separators 152. From the oxygen-containing gas supply channel 94, the oxygen-containing gas is supplied to the oxygen-containing gas channel 68 from the oxygen-containing gas inlets 70, and flows outwardly from the center of the cathode 32 of each of the electrolyte electrode assemblies 36 (see FIGS. 13 and 15).

Thus, in each of the electrolyte electrode assemblies 36, the fuel gas is supplied outwardly from the center of the anode 34, and the oxygen-containing gas is supplied outwardly from the center of the cathode 32. At this time, oxygen ions flow through the electrolyte 30 toward the anode 34 for generating electricity by electrochemical reactions.

The fuel gas and oxygen-containing gas after consumption in the reaction (exhaust gas) flows toward the outer circumferential region of each of the electrolyte electrode assemblies 36, and then, the fuel gas and the oxygen-containing gas flows into the central portion of the separators 152, and are discharged into the four exhaust gas channels 97 of the exhaust gas manifold. The exhaust gas is discharged from the exhaust gas channels 97 to the outside.

In the third embodiment, the same advantages as in the cases of the first and second embodiments can be obtained. The fuel gas paths from the manifold 170 around the center of the separators 152 to the eight electrolyte electrode assemblies 36 arranged along the inner circle P1 have the same length, and the fuel gas paths from the manifold 170 to the eight electrolyte electrode assemblies 36 arranged along the outer circle P2 have the same length. Therefore, the power generation state is uniform in each of the electrolyte electrode assemblies 36, and the desired power generation output is achieved efficiently.

Further, in the third embodiment, sixteen electrolyte electrode assemblies 36 are arranged in each of the separators 152. Therefore, it is not necessary to increase the number of separators 152 to increase the power generation output. Thus, the overall size of the fuel cell stack 142 is reduced effectively. Further, since a large number of electrolyte electrode assemblies 36 are arranged in each of the separators 152, even if several electrolyte electrode assemblies 36 have power generation failures, the desired power generation output of the fuel cell stack 142 as a whole can be maintained without raising any critical problem due to the power generation failures.

Figure 17:
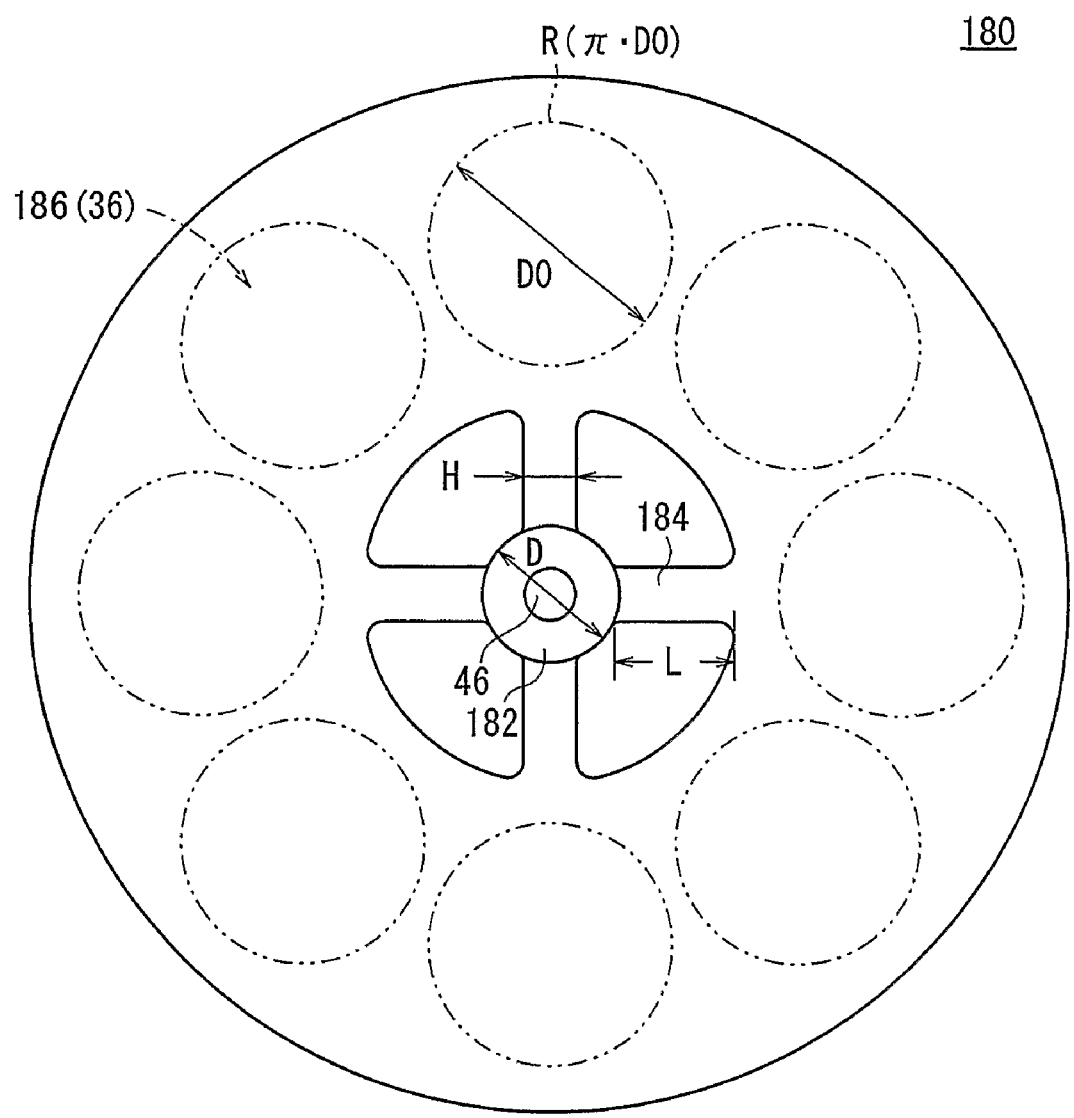
FIG. 17 is a front view showing a fuel cell separator according to a fourth embodiment of the present invention.

FIG. 17 is a front view showing a fuel cell separator 180 according to a fourth embodiment of the present invention.

As in the case of the separator 152, for example, the separator 180 is made up of two plates. The separator 180 has a manifold 182, and the fuel gas supply passage 46 extends through the center of the manifold 182. Four bridges 184 are connected to the manifold 182. In effect, the bridges 184 are connected to the sandwiching section 186.

When, e.g., eight electrolyte electrode assemblies 36 are arranged in a virtual circle around the fuel gas supply passage 46, the electrolyte electrode assemblies 36 are sandwiched between the sandwiching sections 186 of the adjacent separators 180.

The relationship of $0.03 \leq H/R \leq 0.20$ is satisfied by the circumferential length R of the sandwiching sections 186 and the width H of the bridges 184.

The relationship of $0.01 \leq L/R \leq 0.55$ is satisfied by the circumferential length R of the sandwiching sections 186 and the length L of the bridges 184.

The relationship of $0.06 \leq D/R \leq 0.32$ is satisfied by the circumferential length R of the sandwiching sections 186 and the outer diameter D of the manifold 182.

In the fourth embodiment, the same advantages as in the case of the first to third embodiments can be obtained. In the fourth embodiment, the eight electrolyte electrode assemblies 36 are arranged in the single separator 180. However, the present invention is not limited in this respect. As long as the circumferential length R, the width H, the length L, and the outer diameter D satisfy the above relationships, the number of the electrolyte electrode assemblies 36 can be determined arbitrarily.

Figure 18:
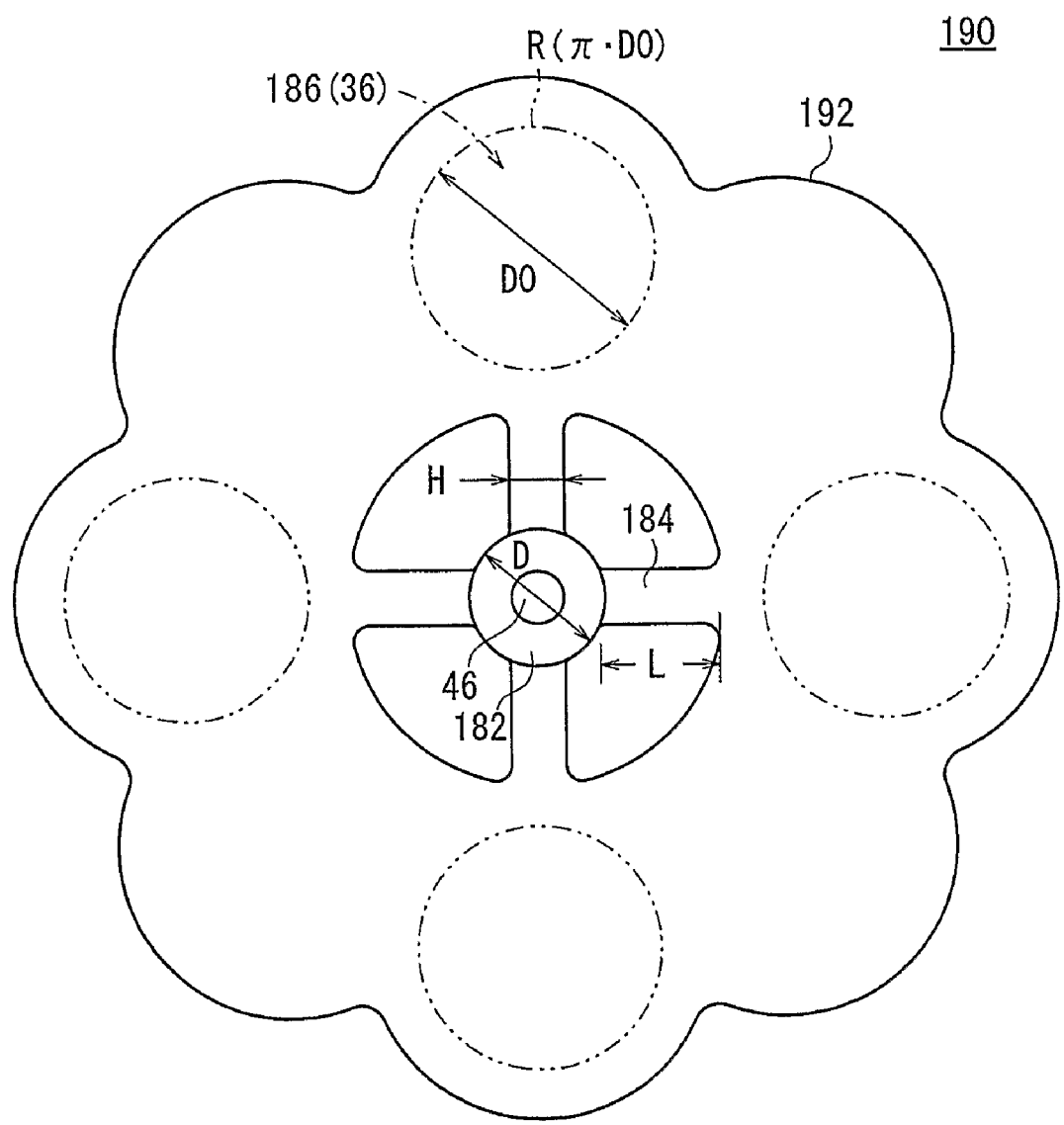
FIG. 18 is a view showing a fuel cell separator according to a fifth embodiment of the present invention.

For example, in the case of a fuel cell separator 190 according to a fifth embodiment of the present invention shown in FIG. 18, four electrolyte electrode assemblies 36 are arranged in the separator 190. The separator 190 may have a curved outer section 192. In the fifth embodiment, the same advantages as in the case of the fourth embodiment can be obtained.

Figure 19:
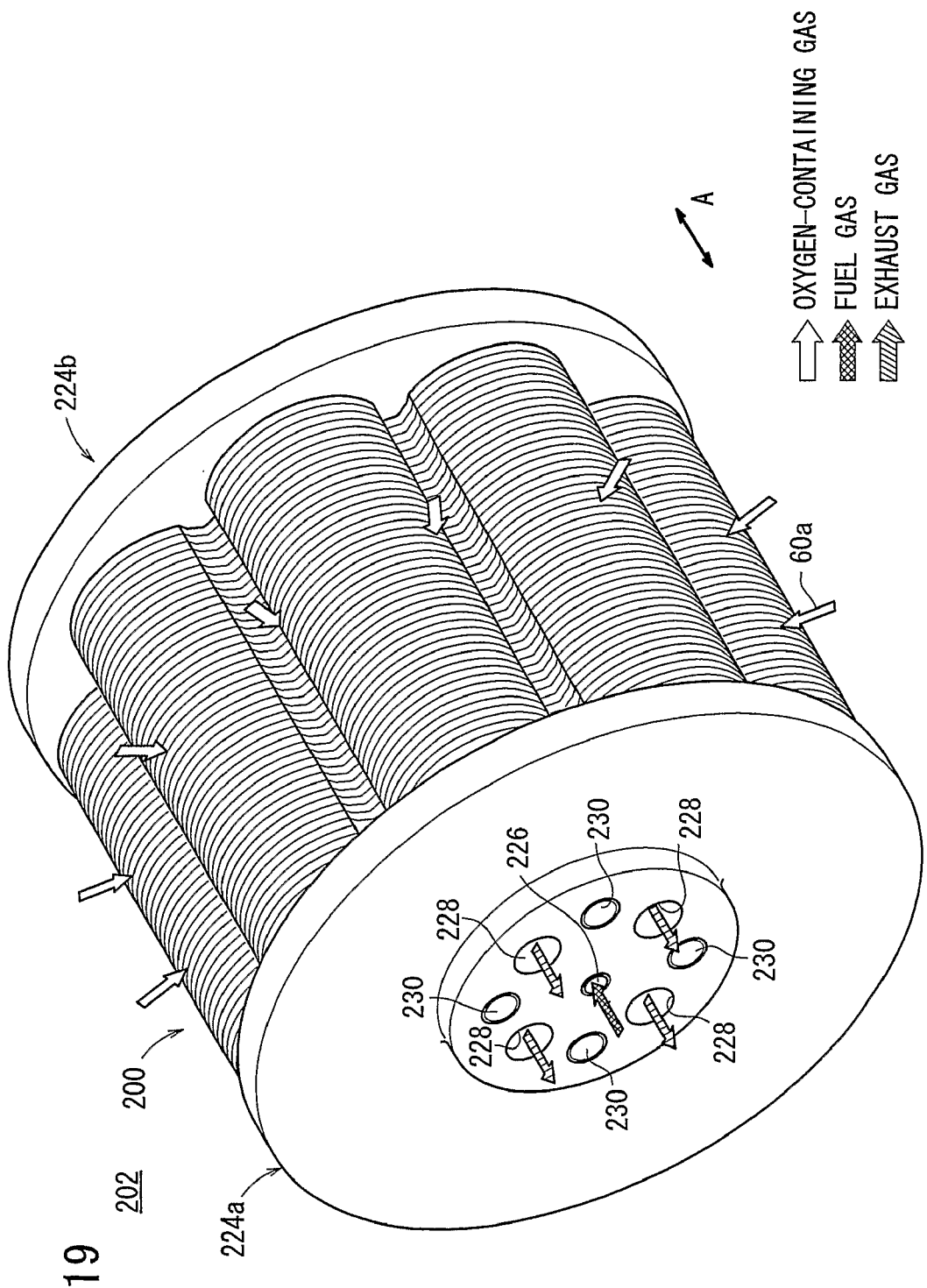
FIG. 19 is a perspective view schematically showing a fuel cell stack formed by stacking a plurality of fuel cells each including a fuel cell separator according to a sixth embodiment of the present invention.

FIG. 19 is a perspective view schematically showing a fuel cell stack 202 formed by stacking a plurality of fuel cells 200 each including a fuel cell separator according to a sixth embodiment of the present invention.

Figure 20:
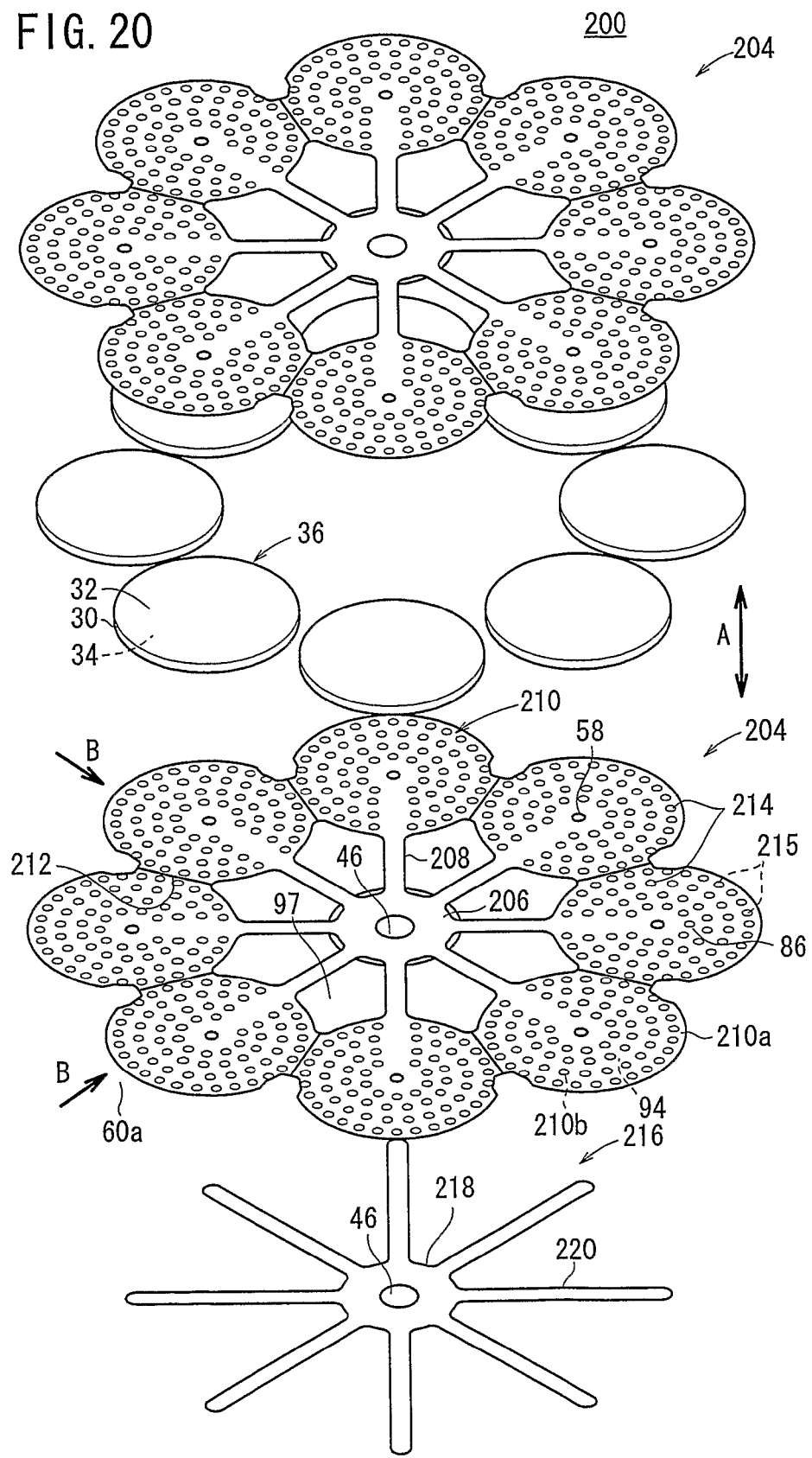
FIG. 20 is an exploded perspective view showing the fuel cell.
Figure 21:
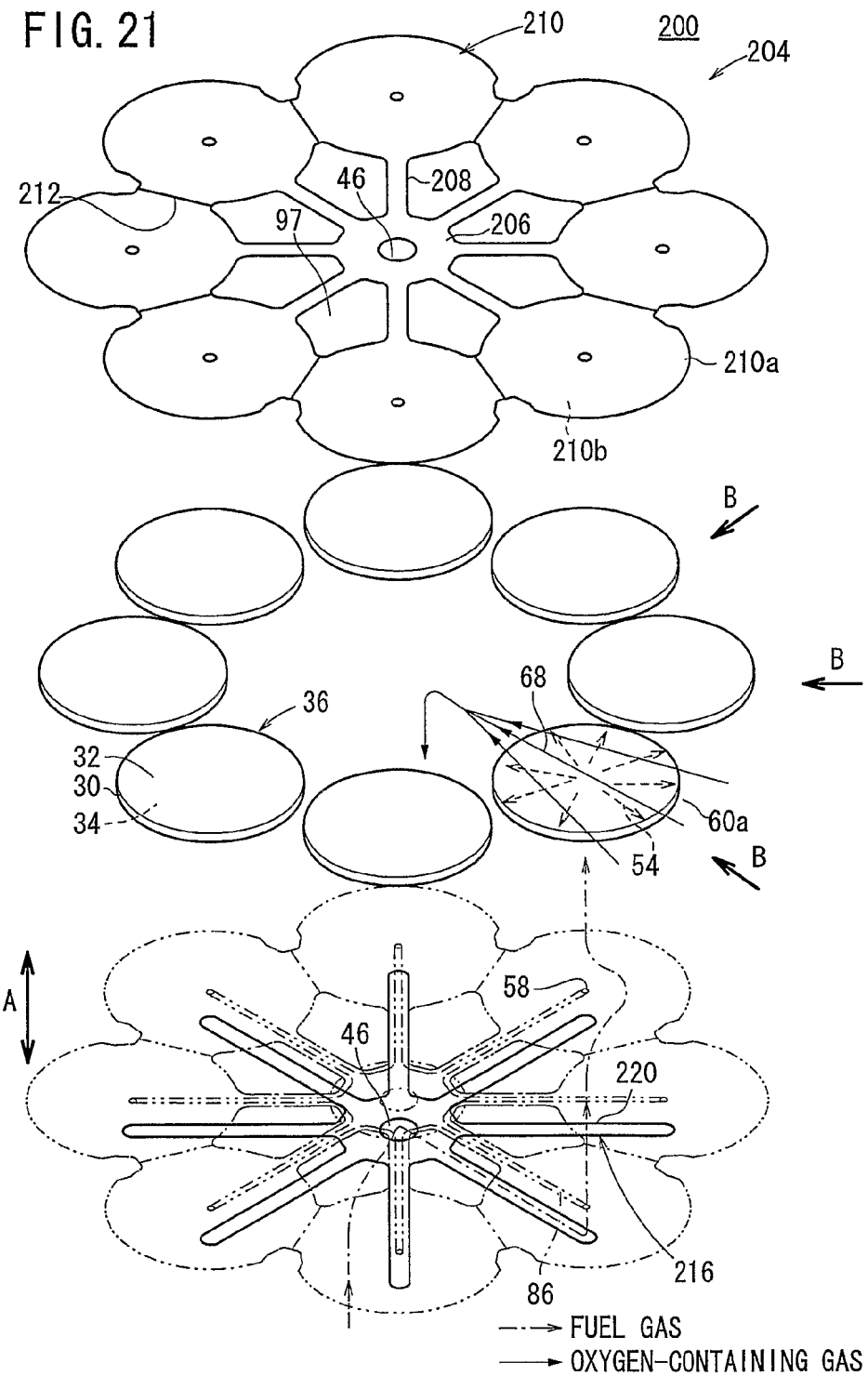
FIG. 21 is a partial exploded perspective view showing gas flows in the fuel cell.

A shown in FIGS. 20 and 21, in the fuel cell 200, a plurality of, e.g., eight electrolyte electrode assemblies 36 are sandwiched between a pair of the separators 204 according to the sixth embodiment. The eight electrolyte electrode assemblies 36 are arranged between the separators 204, concentrically with the fuel gas supply passage 46 extending through the center of the separators 204.

For example, the separators 204 are metal plates or the like. The separator 204 has a manifold 206, and the fuel gas supply passage 46 extends through the center of the manifold 206. A plurality of bridges 208 extend from the manifold 206 radially outwardly at equal intervals (angles), and the bridges 208 are integral with sandwiching sections 210 each having a circular disk shape.

The sandwiching sections 210 and the electrolyte electrode assemblies 36 have substantially the same size. A fuel gas inlet 58 for supplying the fuel gas is provided, e.g., at the center of the sandwiching section 210, or at a position deviated from the center of the sandwiching section 210 in the flow direction of the oxygen-containing gas. The adjacent sandwiching sections 210 are separated through a cutout 212.

A plurality of protrusions 214 forming a fuel gas supply channel 86 for supplying the fuel gas along the electrode surface of the anode 34 is formed on a surface 210a of each sandwiching section 210 which contacts the anode 34. Further, a plurality of protrusions 215 forming an oxygen-containing gas supply channel 94 for supplying the oxygen-containing gas along the electrode surface of the cathode 32 is formed on a surface 210b of each sandwiching section 210 which contacts the cathode 32.

A channel lid member 216 is fixed to a surface of the separator 204 facing the cathode 32, e.g., by brazing, laser welding, or the like. The channel lid member 216 has a planar plate shape. The channel lid member 216 has a small diameter end portion 218. The fuel gas supply passage 46 extends through the center of the small diameter end portion 218. Eight bridges 220 extend radially from the small diameter end portion 218. Each of the bridges 220 is fixed to the separator 204 from the bridge 208 to the surface of the sandwiching section 210 to cover the fuel gas inlet 58.

Figure 22:
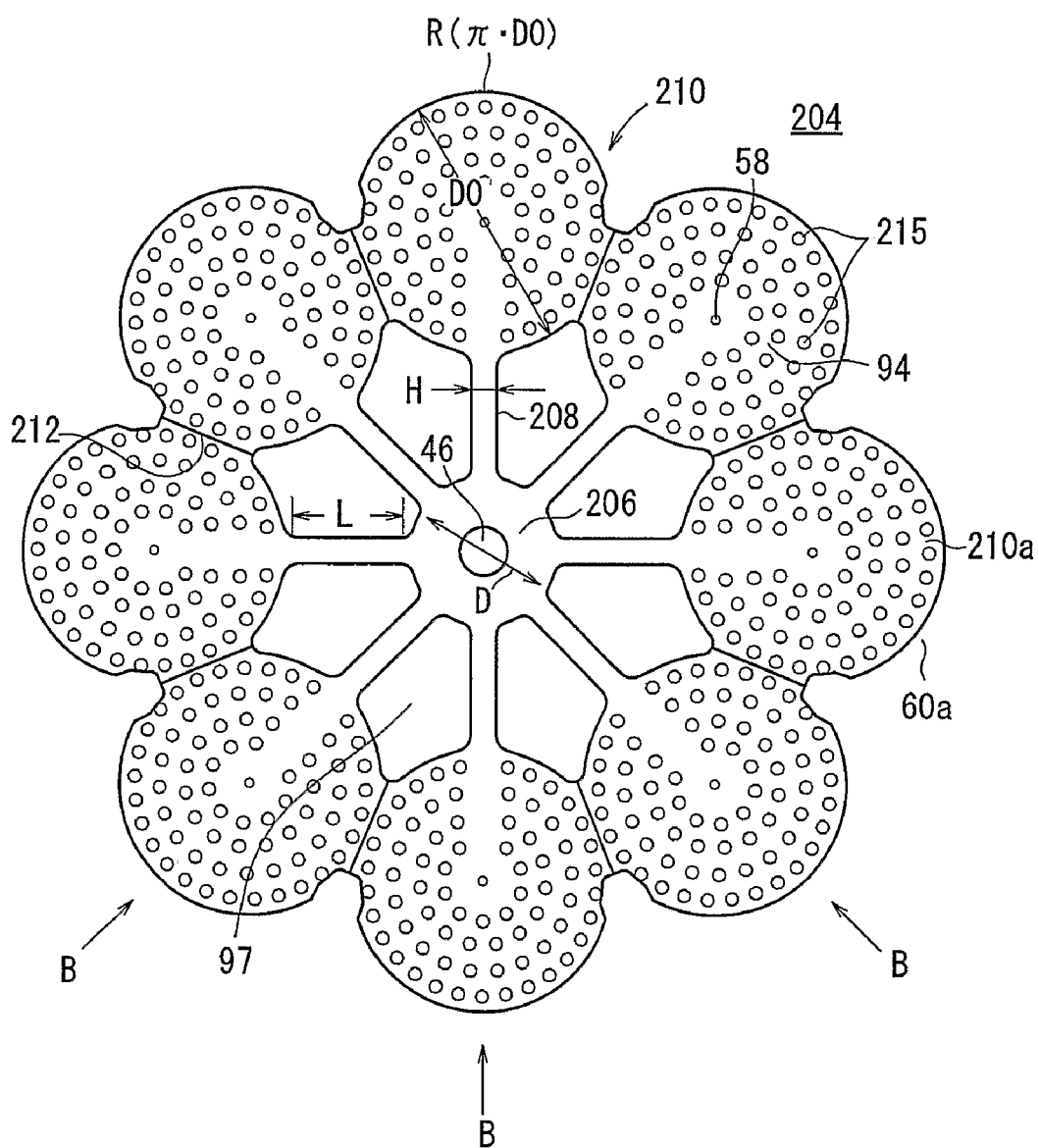
FIG. 22 is a view showing the separator.

In FIG. 22, the relationship of $0.03 \leq H/R \leq 0.20$ is satisfied by the circumferential length R of the sandwiching sections 210 and the width H of the bridges 208. The relationship of $0.01 \leq L/R \leq 0.55$ is satisfied by the circumferential length R of the sandwiching sections 210 and the length L of the bridges 208. The relationship of $0.06 \leq D/R \leq 0.32$ is satisfied by the circumferential length R of the sandwiching sections 210 and the outer diameter D of the manifold 206.

Figure 23:
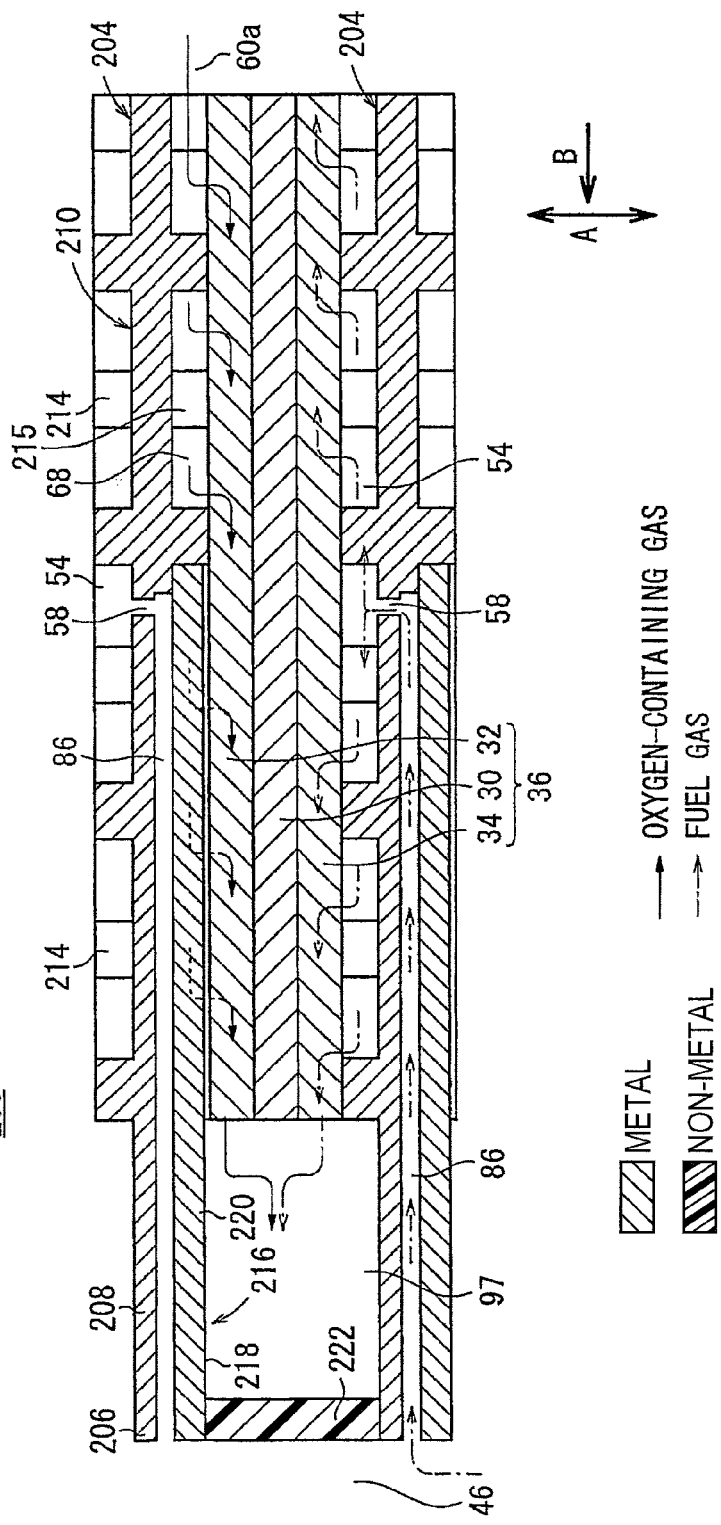
FIG. 23 is a cross sectional view showing operation of the fuel cell.

As shown in FIG. 23, an insulating seal 222 for sealing the fuel gas supply passage 46 is provided between the separators 204. In the fuel cell 200, an oxygen-containing gas supply channel 60a is provided outside the sandwiching sections 210, and exhaust gas channels 97 are provided around the manifold 206.

As shown in FIG. 19, the fuel cell stack 202 includes end plates 224a, 224b provided at opposite ends of the fuel cells 200 in the stacking direction. The end plate 224a has a substantially circular disk shape, and a hole 226 corresponding to the fuel gas supply passage 46 is provided at the center of the end plate 224a. Further, a plurality of holes 228 corresponding to the exhaust gas channels 97 are formed in the end plate 224a around the hole 226. Components between the end plates 224a, 224b are tightened in the direction indicated by the arrow A by bolts (not shown) screwed into screw holes 230.

Next, operation of the fuel cell stack 202 will be described.

As shown in FIG. 19, a fuel gas is supplied into the hole 226 of the end plate 224a, and an oxygen-containing gas is supplied into the oxygen-containing gas supply channel 60a formed in the outer circumferential region of the fuel cell 200.

As shown in FIG. 23, the fuel gas flows from the manifold 206 to the fuel gas supply channel 86 in the bridge 208. The fuel gas flows through the fuel gas inlet 58 formed in the sandwiching section 210 toward the fuel gas channel 54 formed by a plurality of protrusions 214. The fuel gas inlet 58 is provided at substantially the central position of the anode 34 of each of the electrolyte electrode assemblies 36. Therefore, the fuel gas is supplied to the fuel gas inlet 58 to substantially the central position of the anode 34, and the flows along the fuel gas channel 54 toward the outer circumferential region of the anode 34.

The oxygen-containing gas flows into the space between the outer circumferential edge of the electrolyte electrode assembly 36 and the outer circumferential edge of the sandwiching section 210 in the direction indicated by the arrow B, and flows toward the oxygen-containing gas channel 68. In the oxygen-containing gas channel 68, the oxygen-containing gas flows from the outer circumferential edge (outer circumferential edge of the separator 204) to the inner circumferential edge (center of the separator 204), i.e., from one end to the other end of the cathode 32 of the electrolyte electrode assembly 36.

Thus, in each of the electrolyte electrode assemblies 36, the fuel gas flows from the center to the outer circumferential side on the electrode surface of the anode 34, and the oxygen-containing gas flows in one direction indicated by the arrow B on the electrode surface of the cathode 32. At this time, oxygen ions flow through the electrolyte 30 toward the anode 34 for generating electricity by electrochemical reactions. The exhaust gas discharged from the outer circumferential region of each of the electrolyte electrode assemblies 36 flows through the exhaust gas channels 97 in the stacking direction, and the exhaust gas is discharged from the fuel cell stack 202.

In the sixth embodiment, the same advantages as in the cases of the first to fifth embodiments can be obtained. Further, in seventh and eighth embodiments as described later, the same advantages can be obtained.

Figure 24:
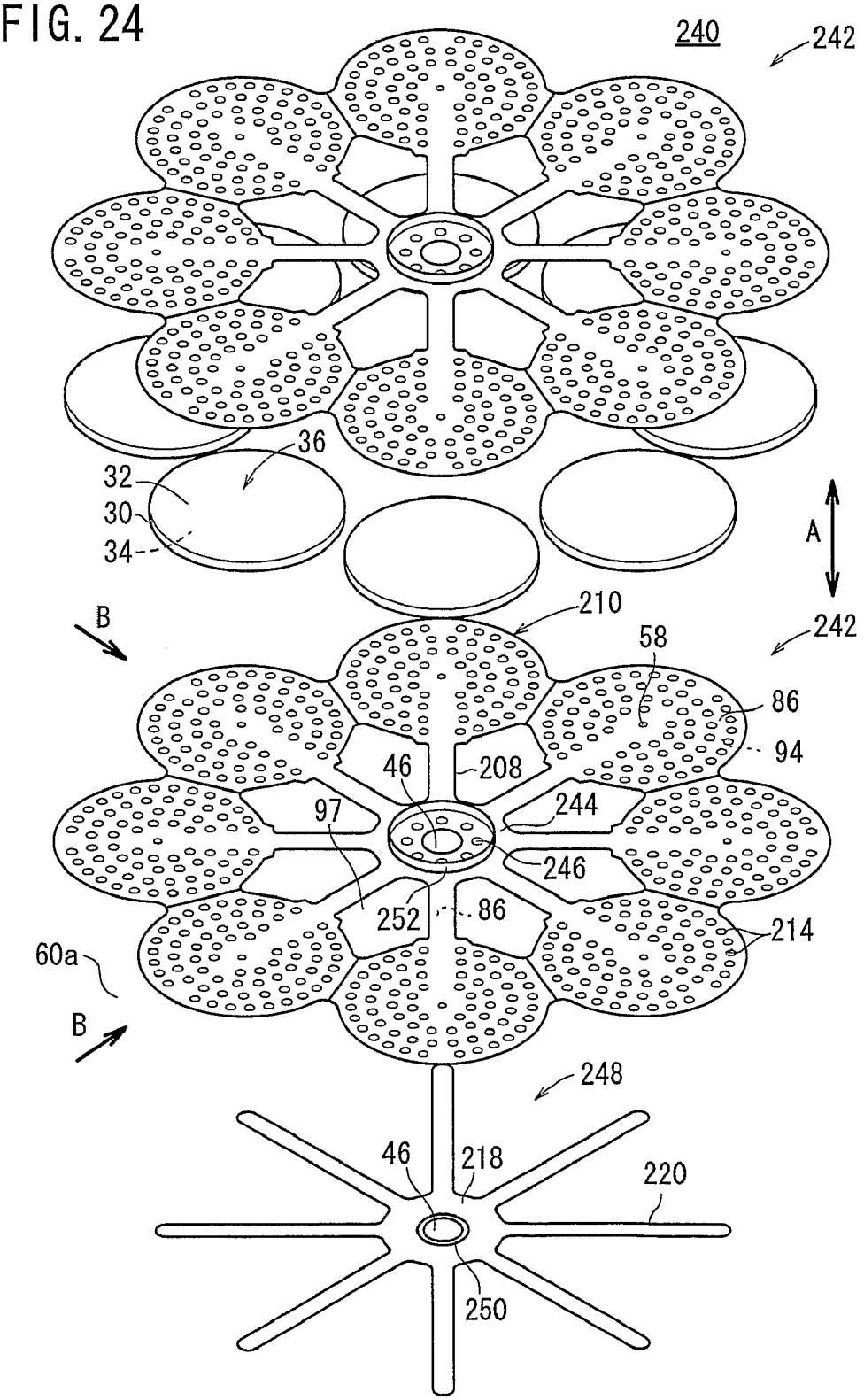
FIG. 24 is an exploded perspective view showing a fuel cell including a fuel cell separator according to a seventh embodiment of the present invention.

FIG. 24 is an exploded perspective view showing a fuel cell 240 including a fuel cell separator according to a seventh embodiment of the present invention. The constituent elements that are identical to those of the fuel cell 200 according to the sixth embodiment are labeled with the same reference numerals, and description thereof will be omitted.

Figure 25:
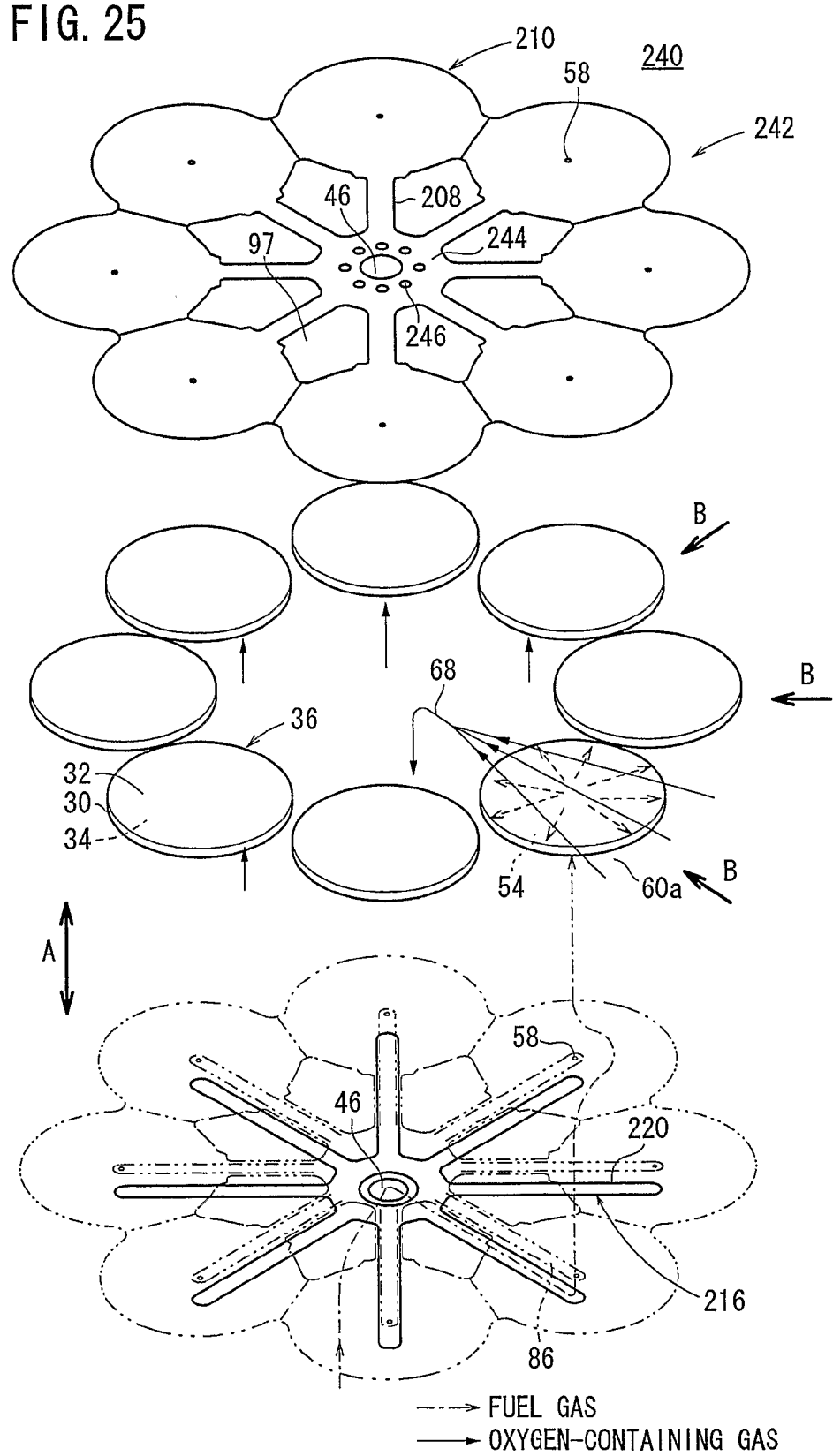
FIG. 25 is a partial exploded perspective view showing gas flows in the fuel cell.

As shown in FIGS. 24 and 25, the fuel cell 240 includes a pair of separators 242 according to the seventh embodiment of the present invention. For example, eight electrolyte electrode assemblies 36 are sandwiched between the separators 242. A manifold 244 is provided at the center of each of the separators 242. The fuel gas supply passage 46 extends through the manifold 244. A plurality of holes 246 are formed around the fuel gas supply passage 46.

A channel lid member 248 is fixed to a surface of the separator 242 facing the cathode 32, e.g., by brazing, laser welding, or the like. The channel lid member 248 has a small diameter end portion 218. The fuel gas supply passage 46 extends through the center of the small diameter end portion 218, and a ring shaped protrusion 250 is provided on the small diameter end portion 218 around the fuel gas supply passage 46. The protrusion 250 seals the fuel gas supply passage 46 from the fuel gas supply channel 86.

Figure 26:
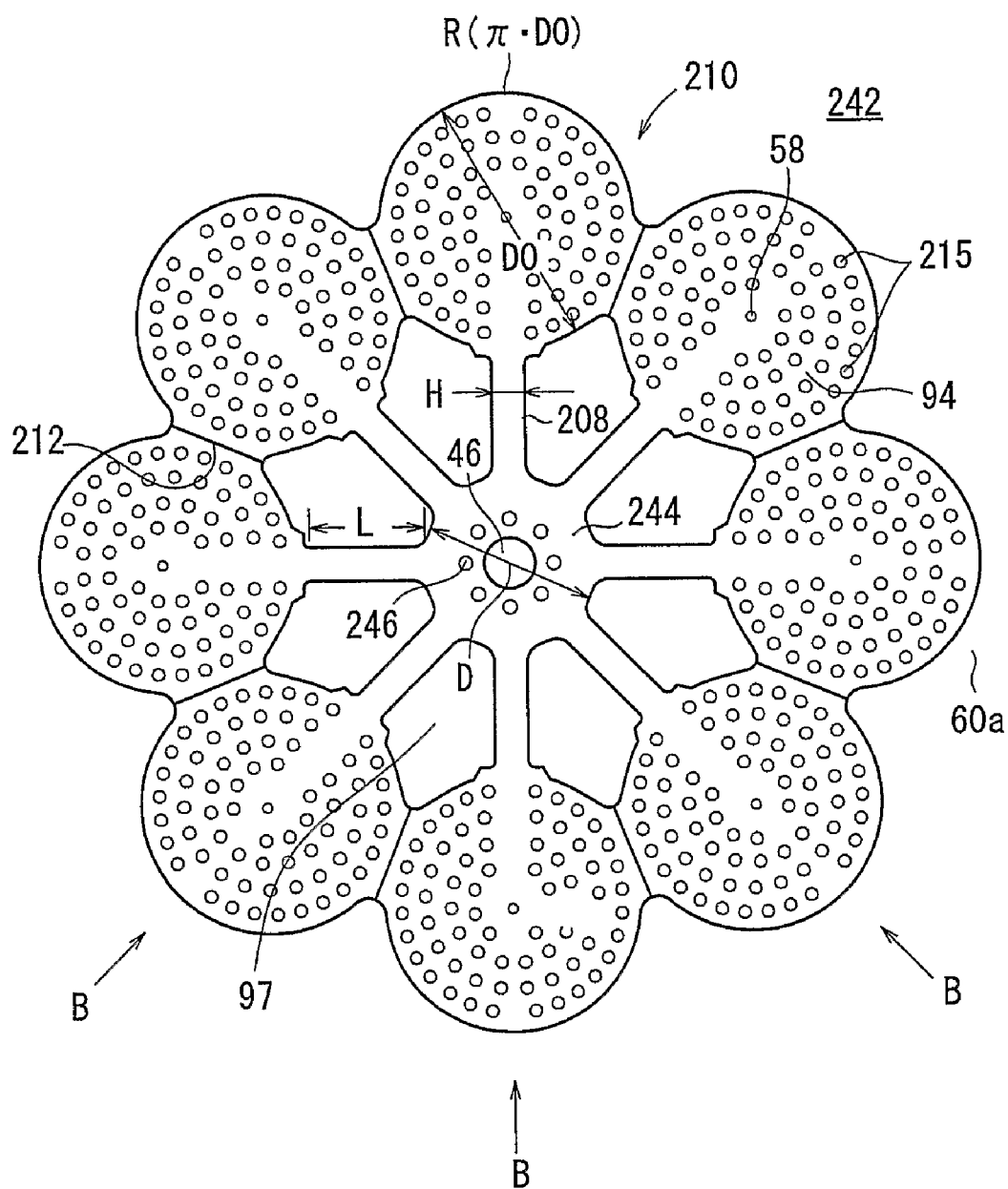
FIG. 26 is a view showing the separator.

In FIG. 26, the relationship of $0.03 \leq H/R \leq 0.20$ is satisfied by the circumferential length R of the sandwiching sections 210 and the width H of the bridges 208. The relationship of $0.01 \leq L/R \leq 0.55$ is satisfied by the circumferential length R of the sandwiching sections 210 and the length L of the bridges 208. The relationship of $0.06 \leq D/R \leq 0.32$ is satisfied by the circumferential length R of the sandwiching sections 210 and the outer diameter D of the manifold 244.

Figure 27:
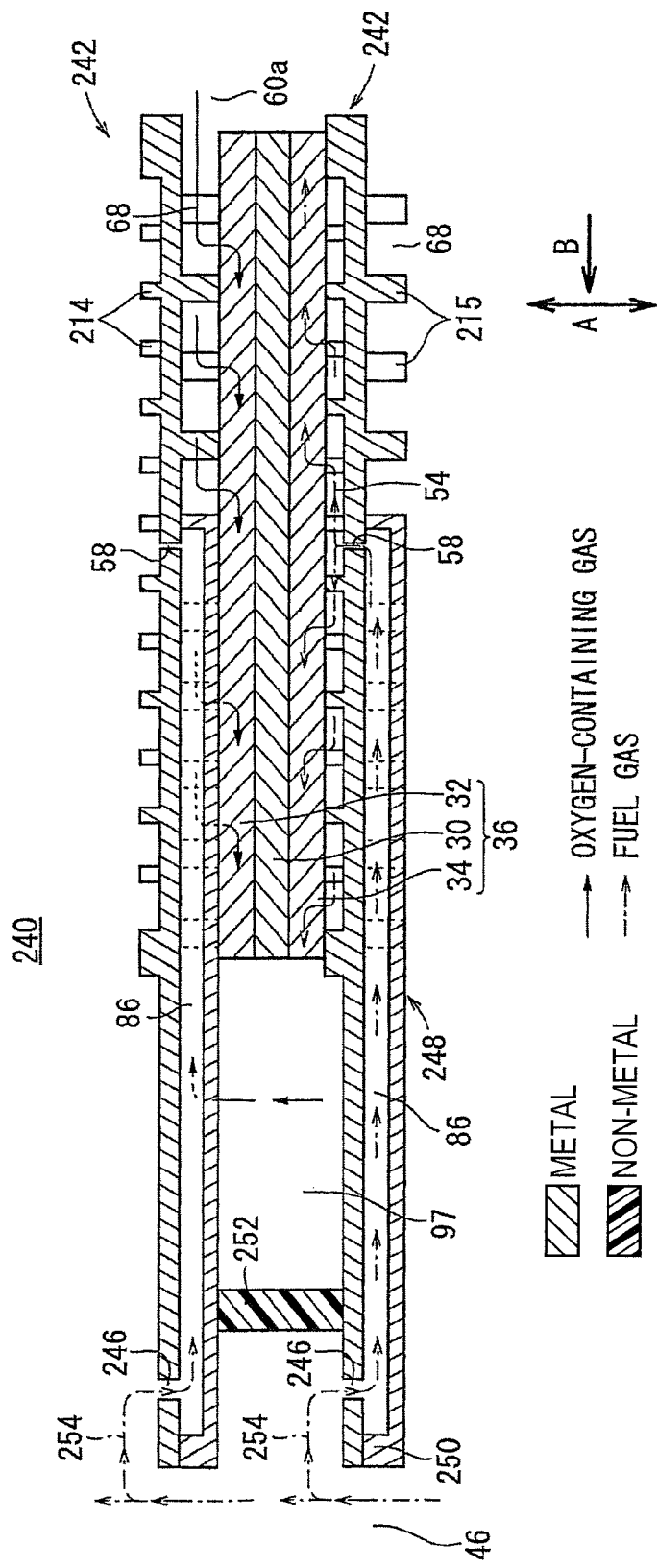
FIG. 27 is a cross sectional view schematically showing operation of the fuel cell.

As shown in FIGS. 24 and 27, an insulating seal 252 is provided around the holes 246 between the separators 242. The insulating seal 252 seals the fuel gas supply passage 46. When the fuel cells 240 are stacked together, a branch channel 254 branching from the fuel gas supply passage 46 along the separator surface in the direction indicated by the arrow B is formed between the separators 242. The branch channel 254 and the fuel gas supply channel 86 are connected together through the holes 246 extending in the stacking direction indicated by the arrow A.

Next, operation of the fuel cell 240 will be described.

As shown in FIG. 27, the fuel gas flows along the fuel gas supply passage 46 of the fuel cell 240 in the stacking direction indicated by the arrow A, and the fuel gas is supplied to the branch channel 254 provided in each fuel cell 240. Thus, the fuel gas flowing in the stacking direction is branched into the branch channel 254, and then flows along the separator surface in the direction indicated by the arrow B. Thereafter, the fuel gas passes through the holes 246, and again, flows in the stacking direction temporarily. Then, the fuel gas flows through the fuel gas supply channel 86 connected to the holes 246 along the separator surface. The fuel gas flows through the fuel gas inlet 58 into the fuel gas channel 54.

The oxygen-containing gas flows into the space between the outer circumferential edge of the electrolyte electrode assembly 36 and the outer circumferential edge of the sandwiching section 210 in the direction indicated by the arrow B, and flows toward the oxygen-containing gas channel 68. Thus, in the electrolyte electrode assembly 36, electricity is generated in the power generation by electrochemical reactions.

Figure 28:
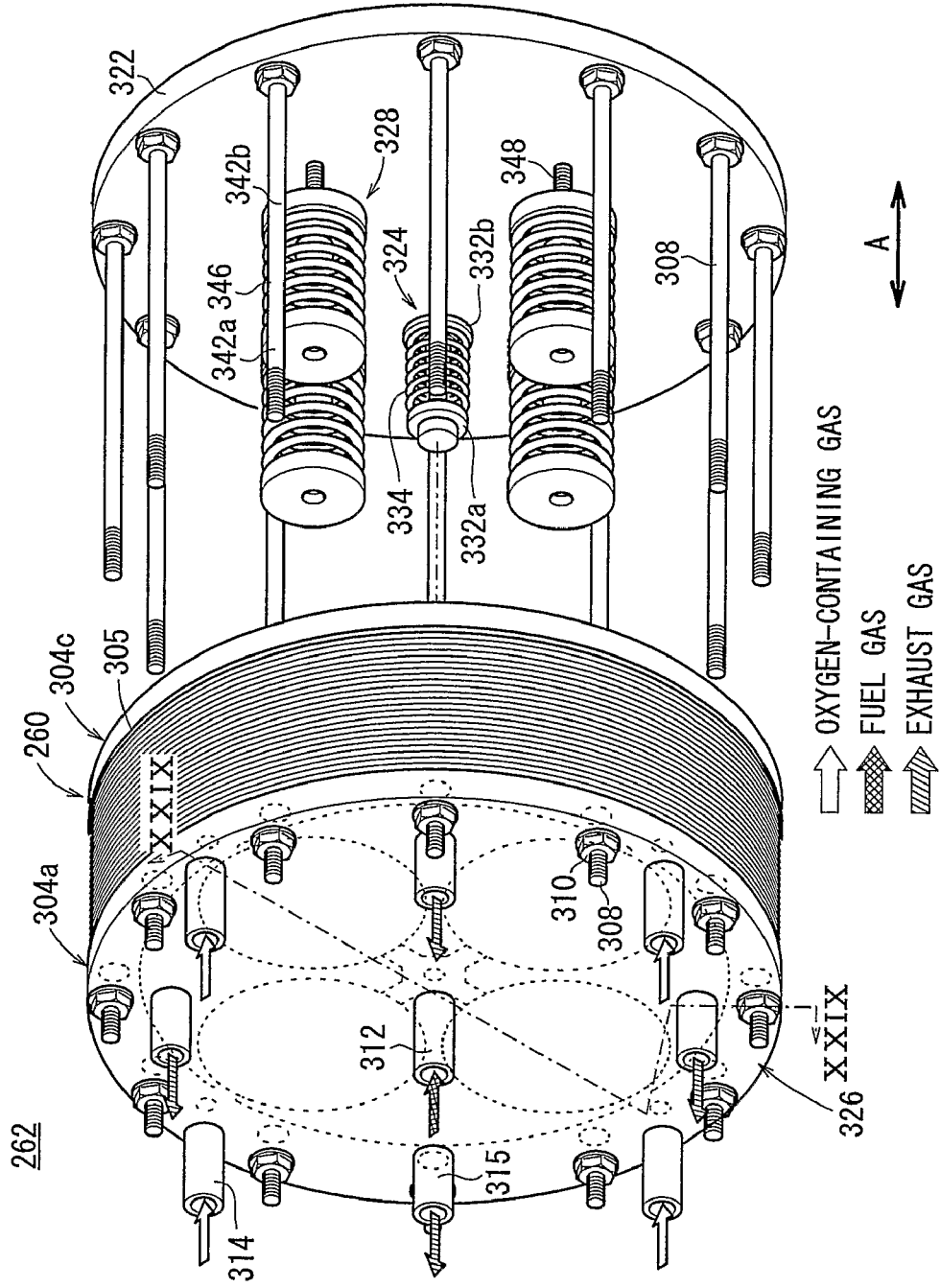
FIG. 28 is a perspective view schematically showing a fuel cell stack formed by stacking a plurality of fuel cells each including a fuel cell separator according to an eighth embodiment of the present invention.
Figure 29:
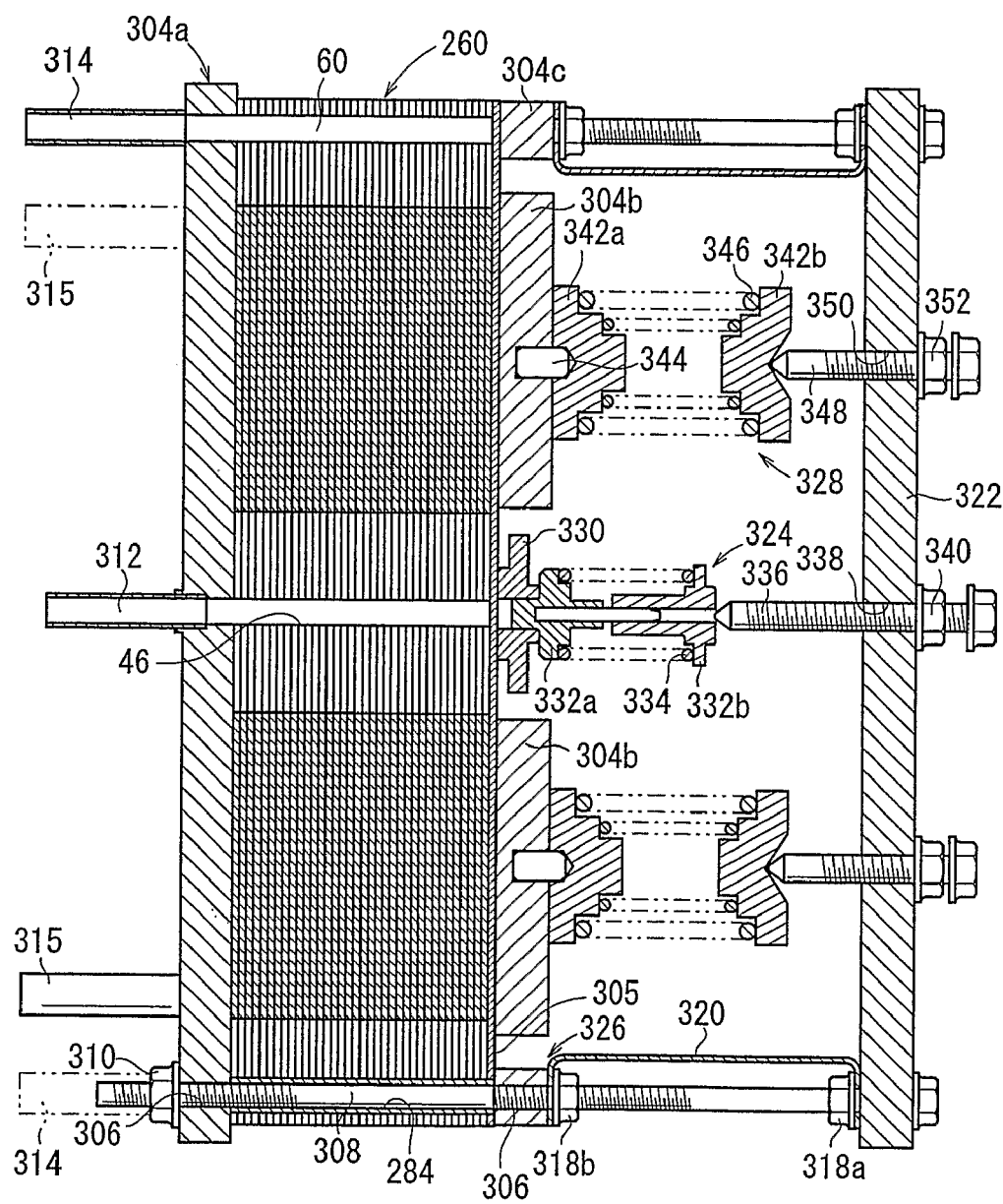
FIG. 29 is a cross sectional view showing the fuel cell stack taken along a line XXIX-XXIX in FIG. 28.

FIG. 28 is a perspective view schematically showing a fuel cell stack 262 formed by stacking a plurality of fuel cells 260 each including a fuel cell separator according to an eighth embodiment of the present invention in a direction indicated by an arrow A. FIG. 29 is a cross sectional view showing the fuel cell stack 262 taken along a line XXIX-XXIX in FIG. 28.

Figure 30:
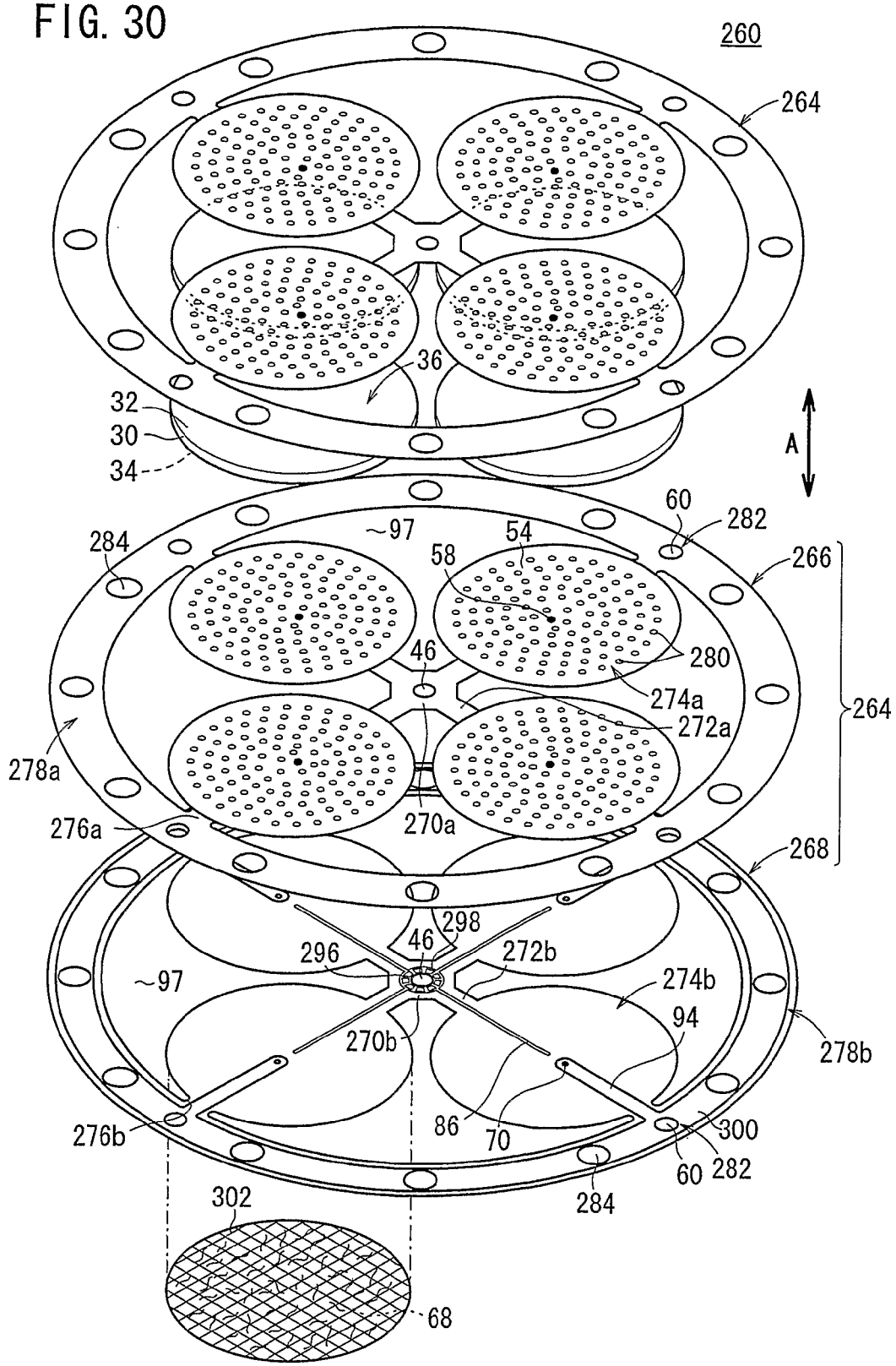
FIG. 30 is an exploded perspective view showing the fuel cell.

As shown in FIG. 30, the fuel cell 260 is formed by sandwiching a plurality of, e.g., four electrolyte electrode assemblies 36 between a pair of separators 264. The four electrolyte electrode assemblies 36 are provided between the separators 264, at equal intervals (angles) around the fuel gas supply passage 46 at the center of the separators 264, along a circle concentrically with the fuel gas supply passage 46.

The separator 264 includes a first plate 266 and a second plate 268. The first plate 266 and the second plate 268 are metal plates of, e.g., stainless alloy. For example, the first plate 266 and the second plate 268 are joined together by diffusion bonding, laser welding, or brazing. Instead of using the metal plates, for example, carbon plates or the like are used as the first plate 266 and the second plate 268 (description about methods of joining the first plate 266 and the second plate 268 made of material other than the metal plates is omitted).

Figure 31:
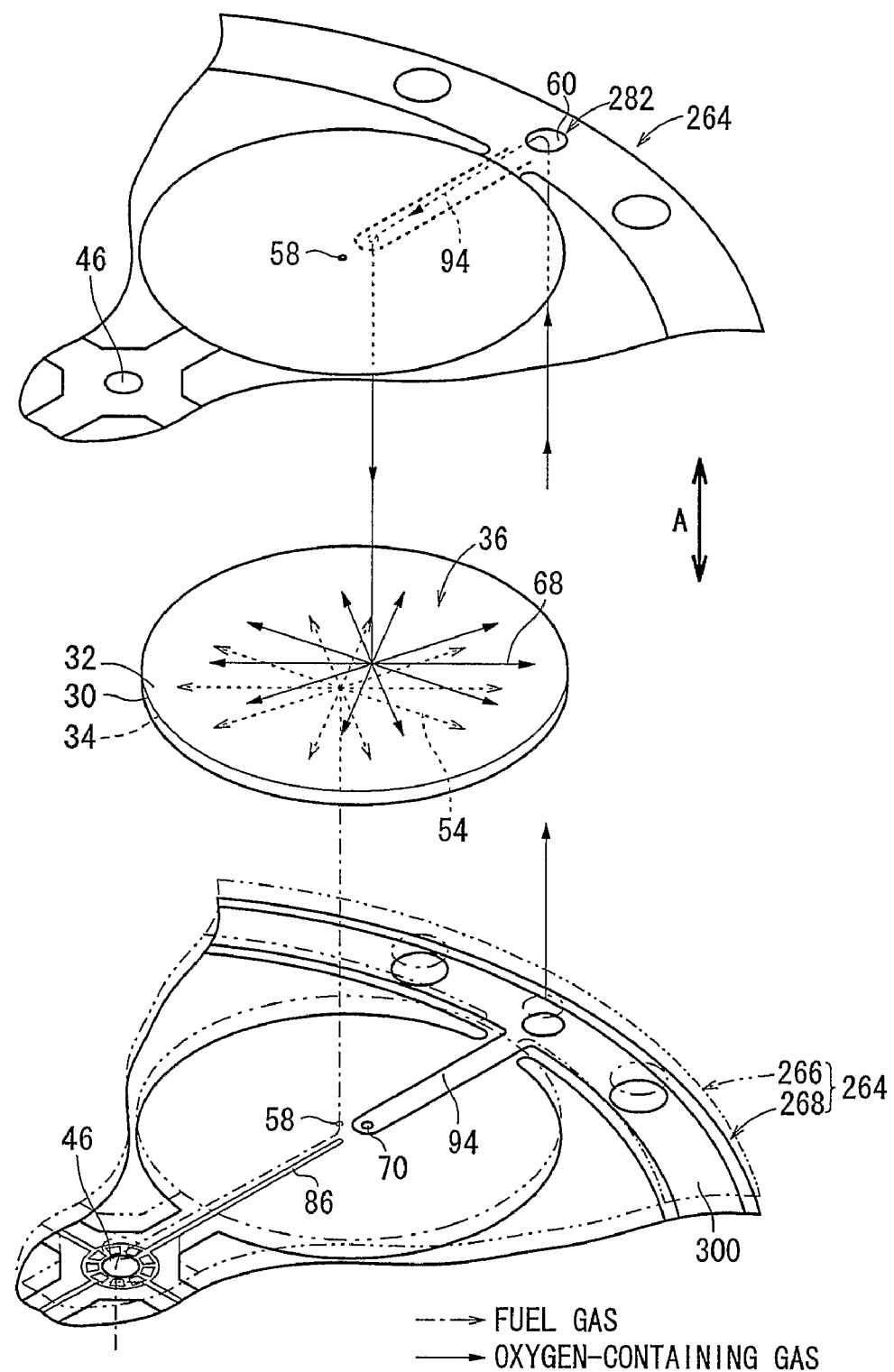
FIG. 31 is a partial exploded perspective view showing gas flows in the fuel cell.
Figure 32:
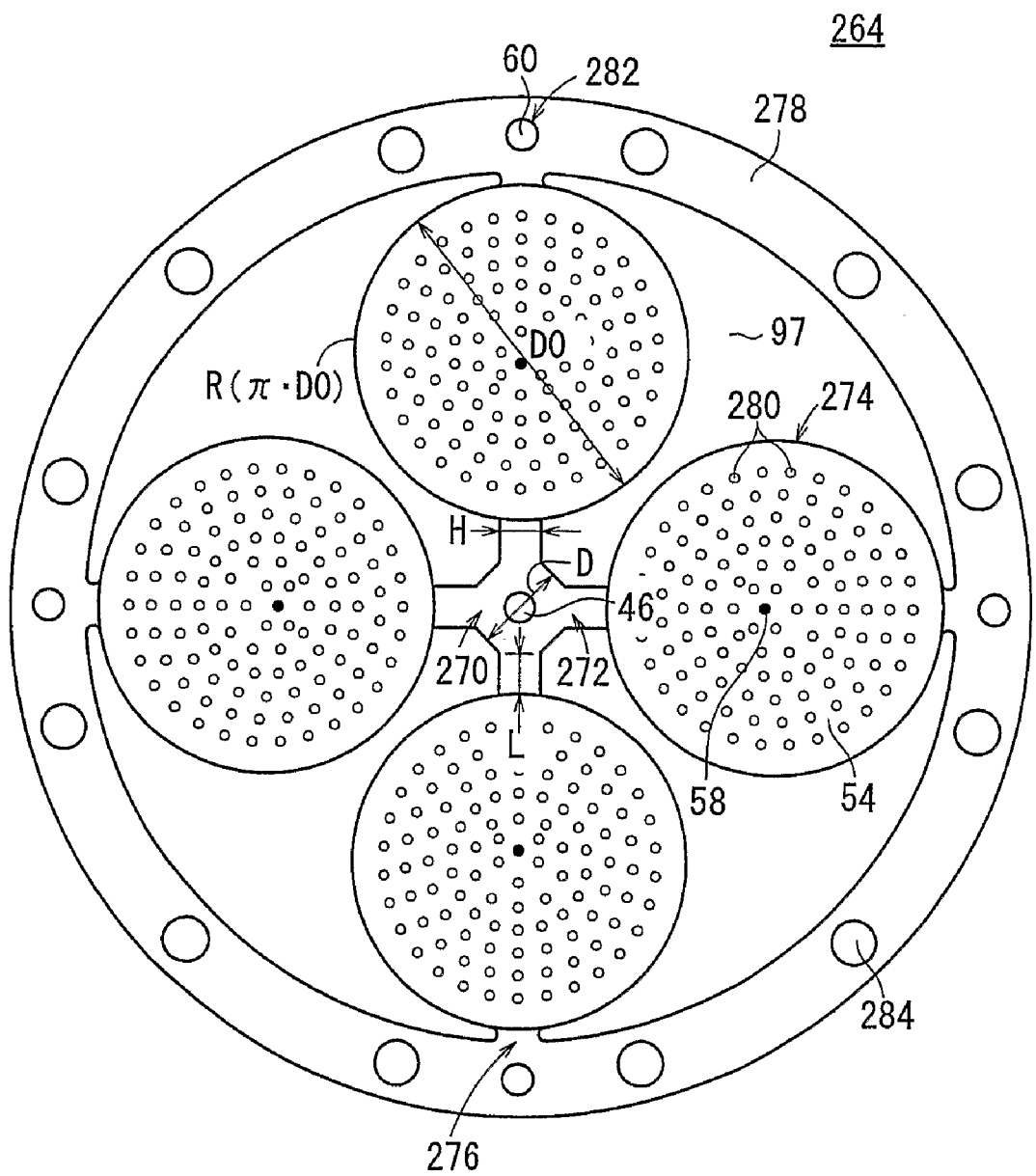
FIG. 32 is a view showing the separator.

As shown in FIGS. 30 to 32, the first plate 266 has a first small diameter end portion 270a. A fuel gas supply passage 46 extends through the center of the first small diameter end portion 270a for supplying the fuel gas in the stacking direction indicated by the arrow A. The first small diameter end portion 270a is integral with first circular disks 274a each having a relatively large diameter through four first plate sections 272a extending radially outwardly from the first small diameter end portion 270a, at equal intervals (angles). The first circular disks 274a and the electrolyte electrode assemblies 36 have substantially the same size. Each of the first circular disks 274a is integral with an annular first case unit 278a through a short second plate section 276a.

The first circular disk 274a has a plurality of protrusions 280 on its surface which contacts the anode 34. The protrusions 280 form a fuel gas channel 54 for supplying a fuel gas along an electrode surface of the anode 34. The protrusions 280 function as a current collector. A fuel gas inlet 58 is provided at substantially the center of the first circular disk 274a, at a position deviated toward the fuel gas supply passage 46 for supplying the fuel gas toward the substantially central region of the anode 34.

The first case unit 278a includes an oxygen-containing gas manifolds 282. An oxygen-containing gas supply passage 60 for supplying oxygen-containing gas to an oxygen-containing gas supply channel 94 passes through each of the oxygen-containing gas manifolds 282 in the stacking direction. The first case unit 278a has a plurality of bolt insertion holes 284 at predetermined intervals (angles). The fuel gas supply passage 46, the first plate sections 272a, the second plate sections 276a, and the oxygen-containing gas supply passages 60 are arranged in a straight line along the separator surface.

Figure 33:
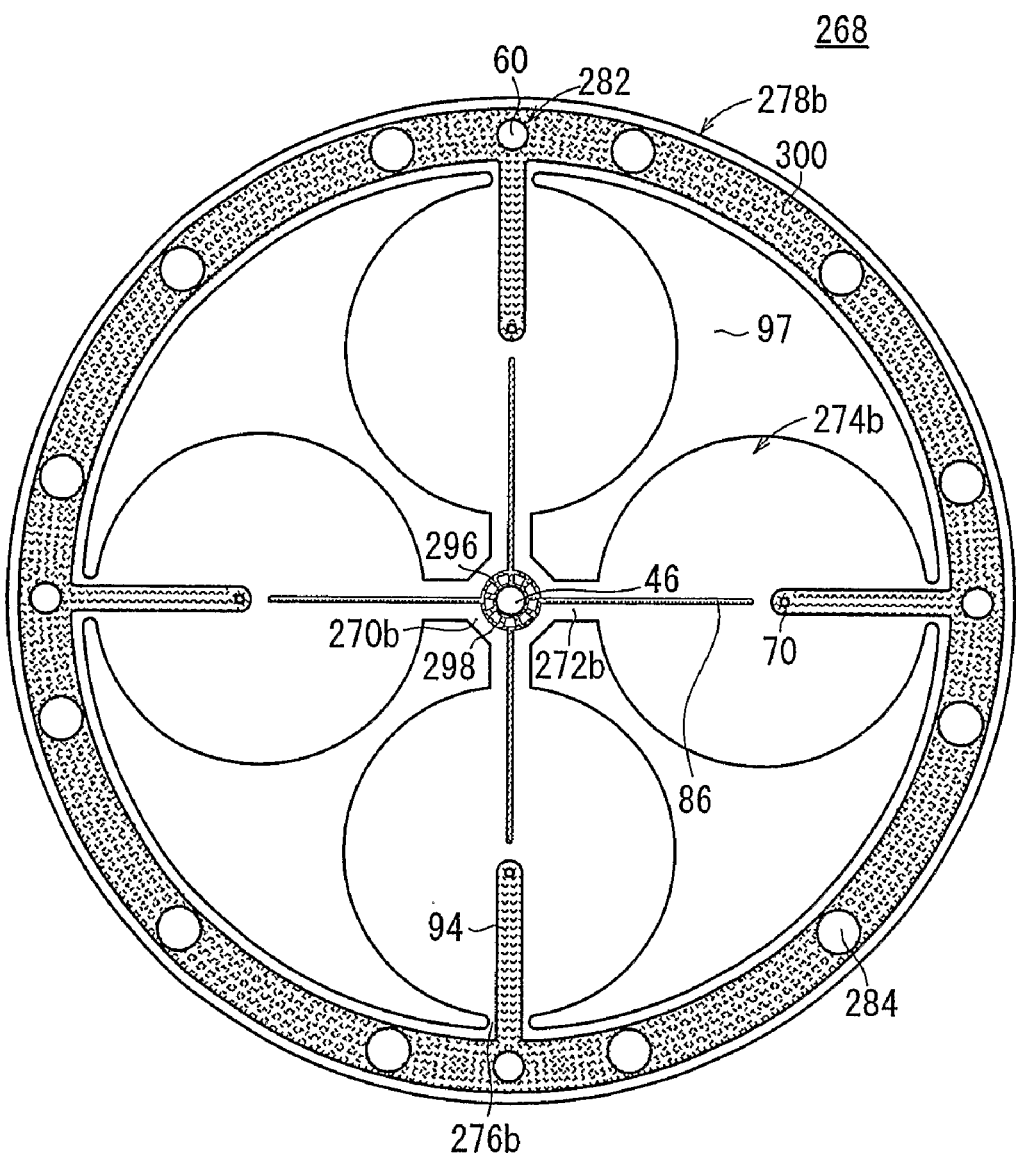
FIG. 33 is a view showing a second plate of the separator.

As shown in FIGS. 30 and 33, the second plate 268 has a second small diameter end portion 270b. A fuel gas supply passage 46 extends through the center of the small diameter end portion 270b. The second small diameter end portion 270b is integral with second circular disks 274b each having a large diameter through four first plate sections 272b extending radially outwardly from the second small diameter end portion 270b. As in the case of the first circular disks 274a, the second circular disks 274b and the electrolyte electrode assemblies 36 have substantially the same size. Each of the second circular disks 274b is integral with an annular second case unit 278b through a short second plate section 276b.

The second small diameter end portion 270b has a plurality of grooves 296 connected to the fuel gas supply passage 46 on a surface which is joined to the first small diameter end portion 270a. The grooves 296 are formed radially around the fuel gas supply passage 46. The grooves 296 are connected to a circular groove 298, and the circular groove 298 is connected to four fuel gas supply channels 86. Each of the fuel gas supply channels 86 extends from the first plate section 272b to a position near the center of the second circular disk 274b until it terminates at the fuel gas inlet 58 of the first plate 266.

The second case unit 278b has manifolds 282 and bolt insertion holes 284. An oxygen-containing gas supply passage 60 extends through each of the manifolds 282 in the stacking direction. The second case unit 278b has a filling chamber 300 on its surface which is joined to the first case unit 278a. The oxygen-containing gas supplied from the oxygen-containing gas supply passages 60 fills the filling chamber 300.

The filing chamber 300 is connected to the oxygen-containing gas supply channels 94 extending from the respective second plate sections 276b to positions near the centers of the second circular disks 274b. The front end of the oxygen-containing gas supply channel 94 is connected to the oxygen-containing gas inlet 70 passing through the second circular disk 274b.

A plurality of protrusions 280 are formed in the first plate 266, e.g., by etching. The grooves 296, the circular groove 298, the fuel gas supply channels 86, the filing chamber 300, and the oxygen-containing gas supply channels 94 are formed in the second plate 268, e.g., by etching.

As shown in FIG. 32, the separator 264 includes the sandwiching sections 274 each having a circular disk shape formed by joining the first circular disk 274a of the first plate 266 and the second circular disk 274b of the second plate 268. The sandwiching section 274 is connected to a first bridge 272 formed by joining the first plate sections 272a, 272b, and connected to a second bridge 276 formed by joining the second plate sections 276a, 276b.

The first bridge 272 is connected to the fuel gas manifold 270 formed by joining the first small diameter end portion 270a and the second small diameter end portion 270b. The second bridge 276 is connected to the manifold 282 formed by joining the first case unit 278a and the second case unit 278b.

The relationship of $0.03 \leq H/R \leq 0.20$ is satisfied by the circumferential length R of the sandwiching sections 274 and the width H of the first bridges 272. The relationship of $0.01 \leq L/R \leq 0.55$ is satisfied by the circumferential length R of the sandwiching sections 274 and the length L of the first bridges 272. The relationship of $0.06 \leq D/R \leq 0.32$ is satisfied by the circumferential length R of the sandwiching sections 274 and the outer diameter D of the manifold 270.

As shown in FIG. 30, a deformable elastic channel unit, e.g., an electrically conductive felt member (electrically conductive non-fabric such as metal felt) 302 is provided on a surface of the second plate 268 facing the cathode 32. By the felt member 302, the oxygen-containing gas channel 68 is formed between the second circular disk 274b and the cathode 32. Instead of the felt member 302, a mesh member (electrically conductive fabric such as metal mesh), foamed metal, expanded metal, punching metal, pressurized (embossed) metal, or the like may be used. In the circumferential portion of the electrolyte electrode assembly 36, the exhaust gas channel 97 is provided for discharging the fuel gas and oxygen-containing gas after consumption as an exhaust gas.

Figure 34:
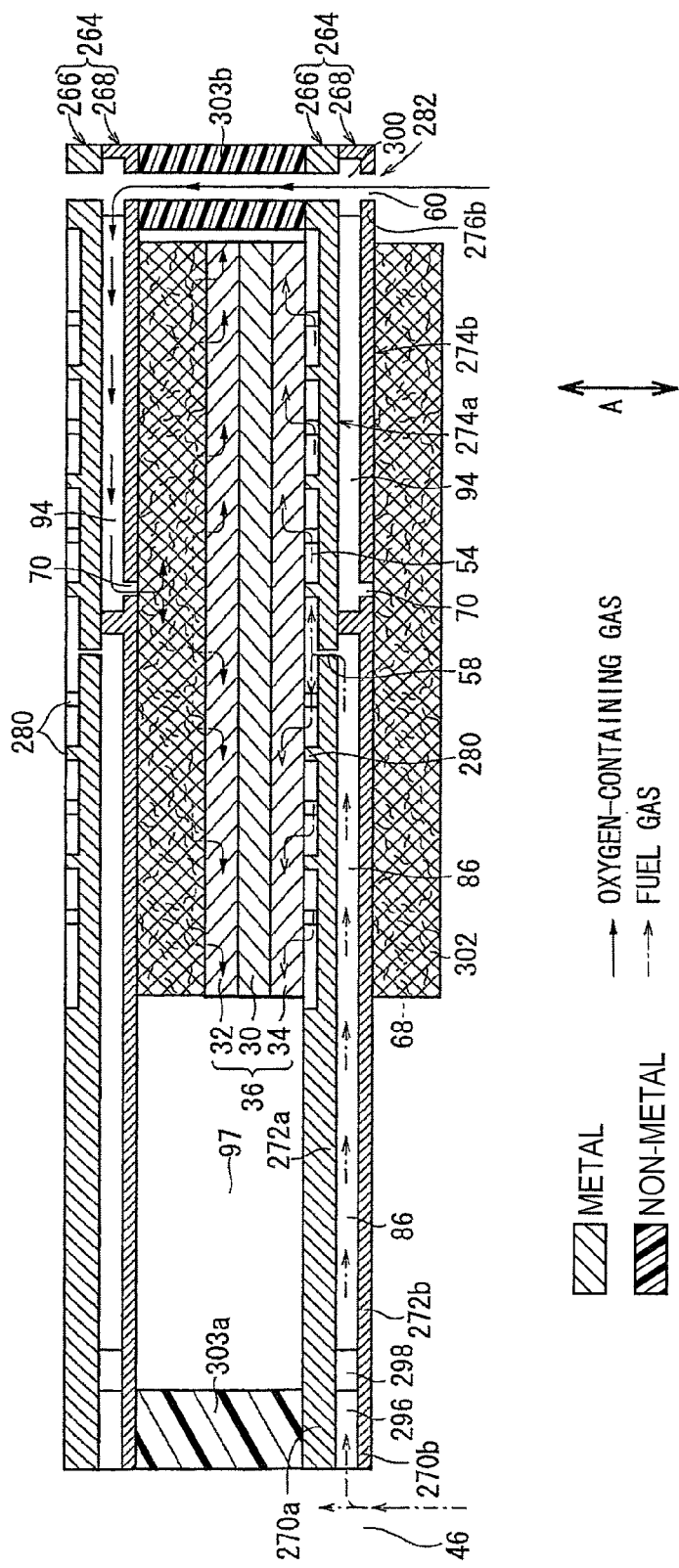
FIG. 34 is a cross sectional view schematically showing operation of the fuel cell.
Figure 35:
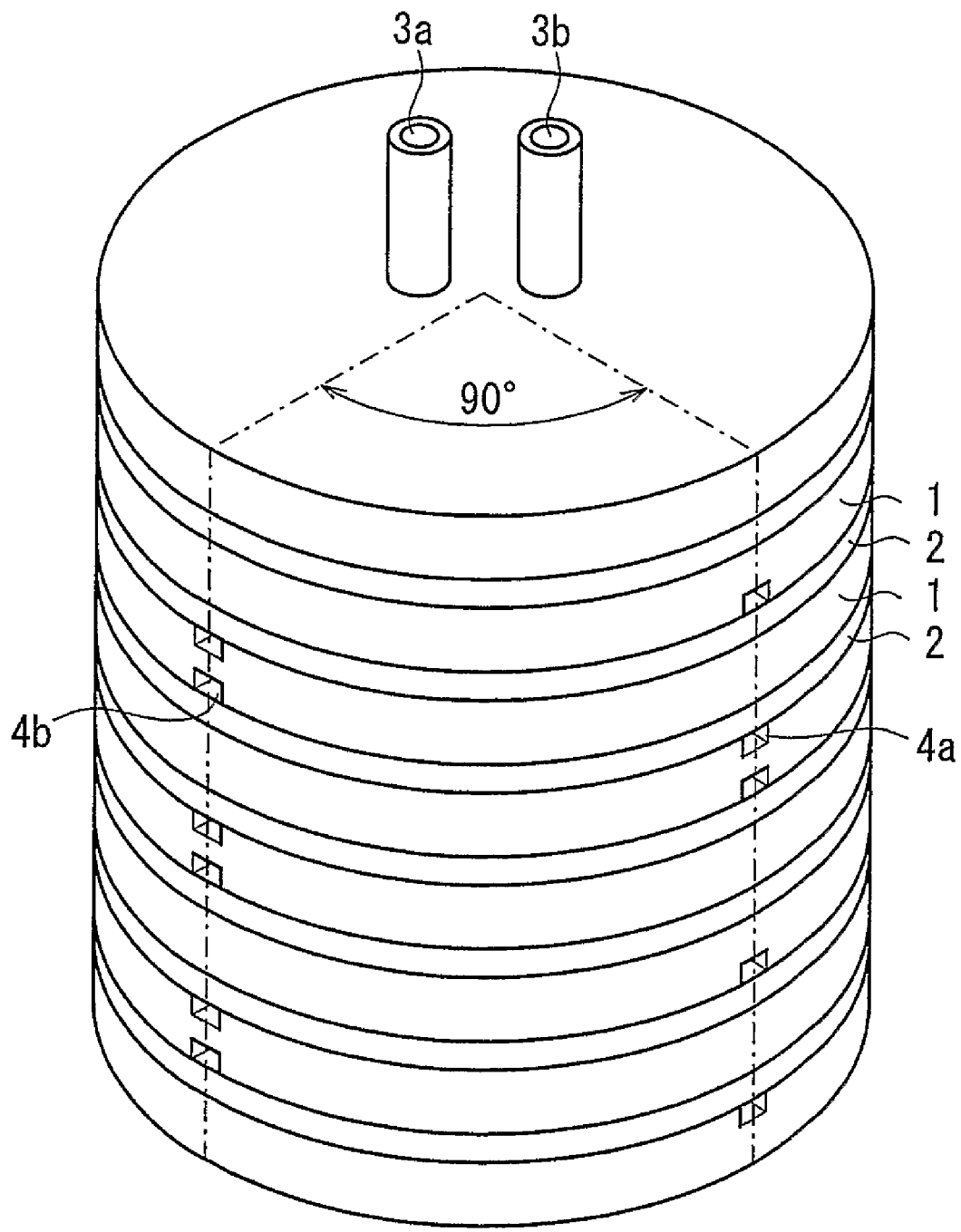
FIG. 35 is a view showing a first conventional example.
Figure 36:
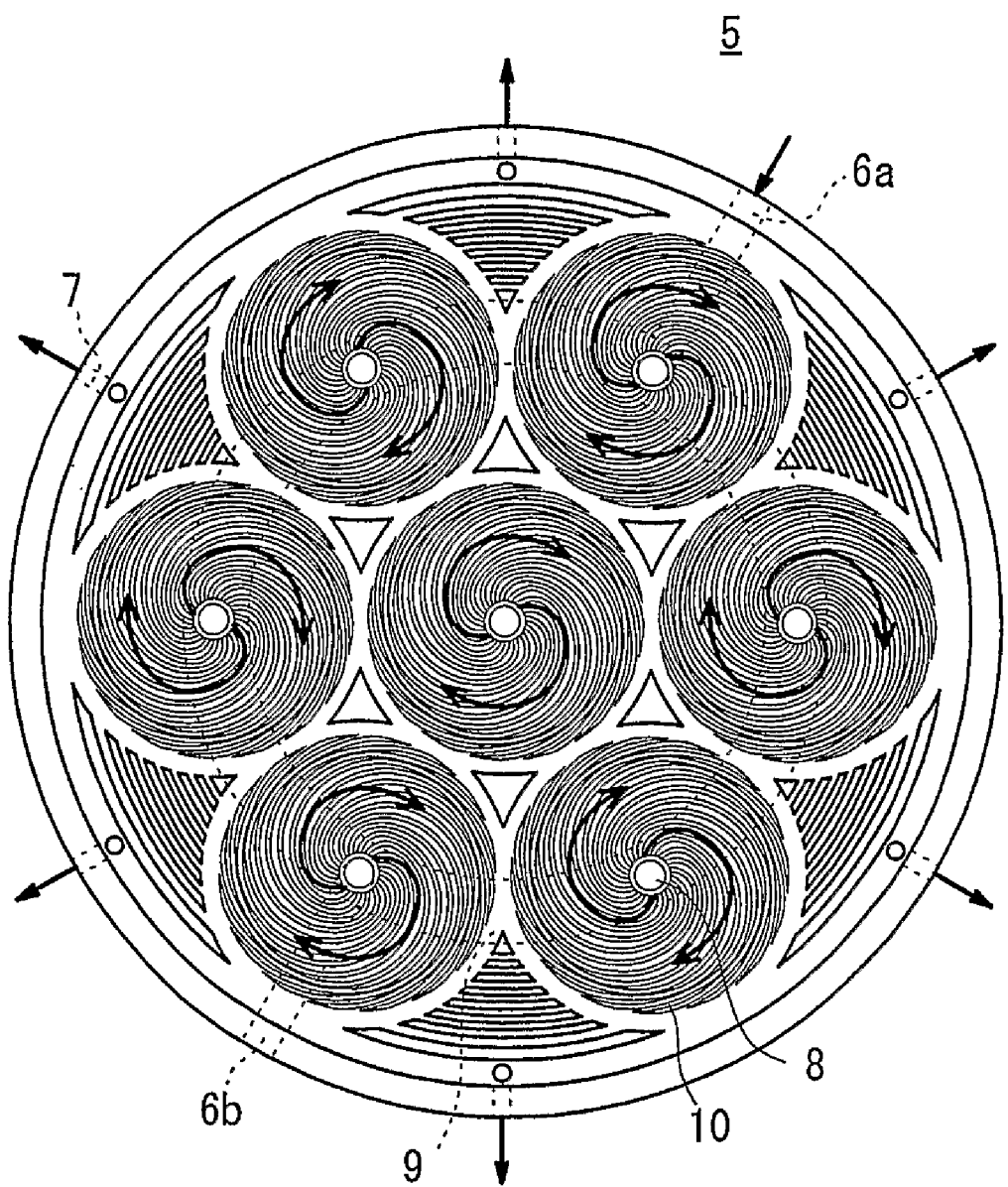
FIG. 36 is a view showing a second conventional example.
Figure 37:
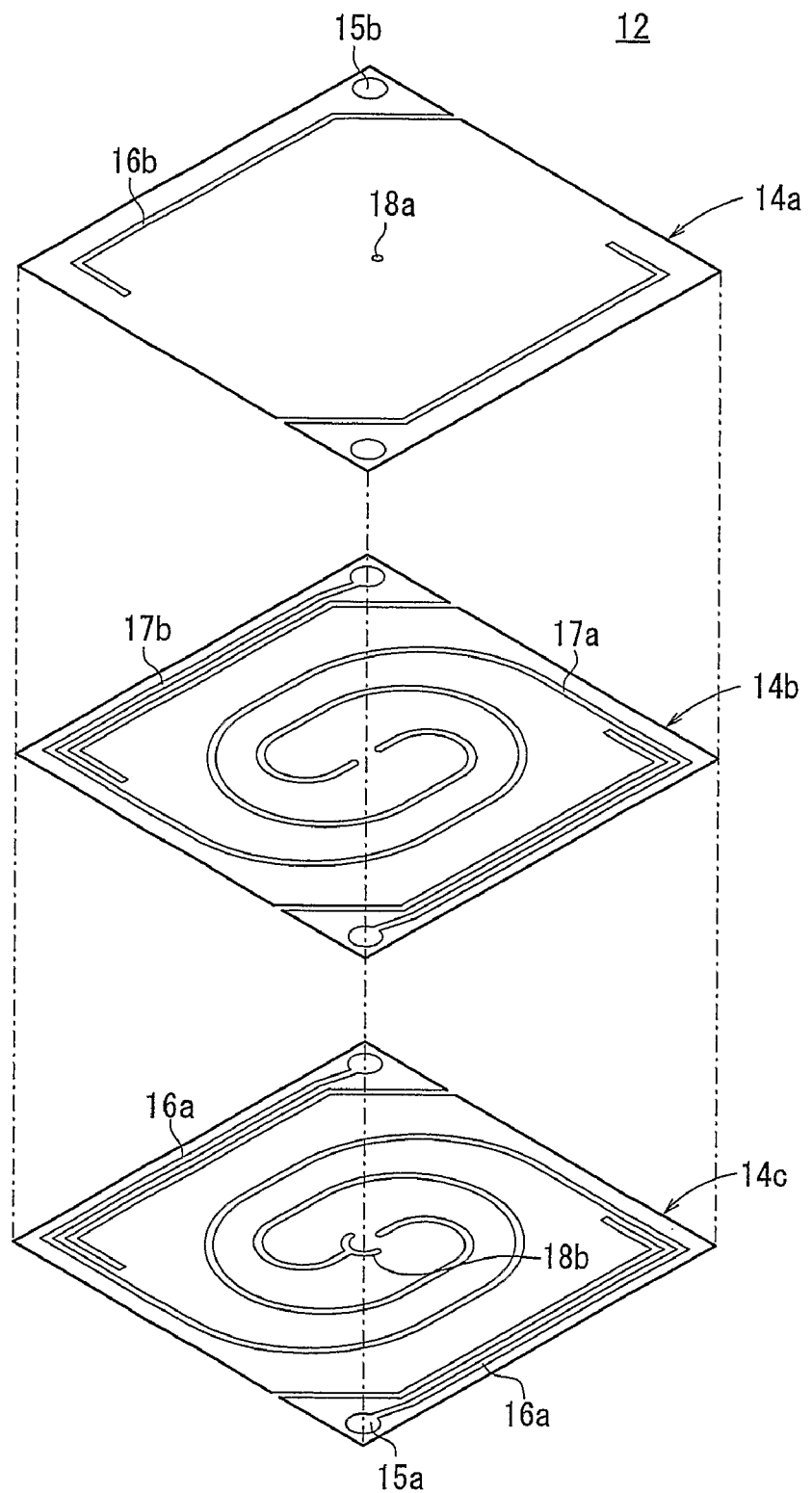
FIG. 37 is a view showing a third conventional example.

As shown in FIG. 34, a first insulating seal 303a for sealing the fuel gas supply passage 46 and a second insulating seal 303b for sealing the oxygen-containing gas supply passage 60 are provided. The first insulating seal 303a and the second insulating seal 303b have good sealing performance. Further, the first insulating seal 303a and the second insulating seal 303b are hard, and cannot be collapsed easily. For example, crustal component material, glass material, composite material of clay and plastic, or the like is used for the first insulating seal 303a and the second insulating seal 303b. Further, preferably, the second insulating seal 303b is a heat insulating member capable of preventing diffusion of heat energy.

As shown in FIGS. 28 and 29, the fuel cell stack 262 includes a first end plate 304a having a substantially circular disk shape at one end of the stacked fuel cells 260 in the stacking direction. Further, the fuel cell stack 262 includes a plurality of second end plates 304b each having a small diameter and a substantially circular disk shape, and a fixing ring 304c having a large diameter in a substantially ring shape at the other end of the fuel cells 260 in the stacking direction. A partition wall 305 prevents diffusion of the exhaust gas to the outside of the fuel cells 260. The four second end plates 304b are provided at positions of the stacked electrolyte electrode assemblies 36.

The first end plate 304a and the fixing ring 304c have a plurality of holes 306 connected to the bolt insertion holes 284 of the separator 264. The first case unit 278a and the second case unit 278b of the separator 264 are tightened (fixed) to the first end plate 304a through bolts 308 inserted into the bolt insertion holes 284 via the holes 306 and nuts 310 fitted to the bolts 308.

A fuel gas supply pipe 312 connected to the fuel gas supply passage 46, four oxygen-containing gas supply pipes 314 connected to the oxygen-containing gas supply passages 60, and four exhaust gas discharge pipes 315 connected to the exhaust gas channel 97 are provided at the first end plate 304a.

The first end plate 304a is fixed to a support plate 322 through the bolts 308, nuts 318a, 318b, and collar plates 320. A first load applying unit 324, second load applying units 326, and third load applying units 328 are provided between the support plate 322 and the first end plate 304a. The first load applying unit 324 applies a tightening load to the manifold 270. The second load applying units 326 apply a tightening load to the manifolds 282, and the third load applying units 328 apply a tightening load to the electrolyte electrode assemblies 36.

The first load applying unit 324 has a presser member 330 provided at the center of the fuel cells 260 (center of the manifold 270) for preventing leakage of the fuel gas from the fuel gas supply passage 46. The presser member 330 is provided at a position near the center of the four second end plates 304b for pressing the fuel cells 260 against the partition wall 305. A first spring 334 is provided on the presser member 330 through a first receiver member 332a and a second receiver member 332b. A front end of a first presser bolt 336 contacts the second receiver member 332b. The first presser bolt 336 is screwed into a first screw hole 338 formed in the support plate 322, and fixed by the first nut 340, and the position of the first presser bolt 336 is adjustable by the first nut 340.

The second load applying unit 326 includes the bolt 308 inserted into the bolt insertion hole 284 through the hole 306, and the nut 310 fitted to the bolt 308. The second load applying unit 326 prevents leakage of the oxygen-containing gas from the oxygen-containing gas supply passage 60.

The third load applying unit 328 has a third receiver member 342a provided on the second end plate 304b at a position corresponding to each of the electrolyte electrode assemblies 36. The third receiver member 342a is positioned by a pin 344, and supported on the second end plate 304b. One end of the second spring 346 contacts the third receiver member 343a, and the other end of the second spring 346 contacts a fourth receiver member 342b. The fourth receiver member 342b contacts the front end of the second presser bolt 348. The second presser bolt 348 is screwed into a second screw hole 350 formed in the support plate 322, and fixed by a second nut 352, and the position of the second presser bolt 348 is adjustable by the second nut 352.

Next, operation of the fuel cell stack 262 will be described below.

As shown in FIG. 28, a fuel gas is supplied from the fuel gas supply pipe 312 connected to the first end plate 304a, and the fuel gas flows into the fuel gas supply passage 46. The air as the oxygen-containing gas is supplied from the oxygen-containing gas supply pipes 314, and the air flows into the oxygen-containing gas supply passages 60.

As shown in FIGS. 31 and 34, after the fuel gas is supplied to the fuel gas supply passage 46, the fuel gas flows in the stacking direction indicated by the arrow A, and flows from the grooves 296 to the circular groove 298 on the second plate 268 of the second separator 264 of each fuel cell 260. Then, the fuel gas is supplied to each fuel gas supply channel 86. The fuel gas flows along the fuel gas supply channel 86, and flows through the fuel gas inlet 58 of the first plate 266 into the fuel gas channel 54.

The fuel gas inlet 58 is provided at substantially the central position of the anode 34 of each of the electrolyte electrode assemblies 36. Thus, the fuel gas is supplied from the fuel gas inlet 58 to the anode 34, and flows along the fuel gas channel 54 outwardly from the substantially central region to the outer circumferential region of the anode 34.

The air supplied to the oxygen-containing gas supply passage 60 temporarily flows into the filling chamber 300 provided between the first case unit 278a of the first plate 266 and the second case unit 278b of the second plate 268. The filing chamber 300 is connected to the oxygen-containing gas supply channels 94. The oxygen-containing gas flows along each of the oxygen-containing gas supply channels 94 toward the center of the sandwiching section 274.

The oxygen-containing gas inlet 70 is provided at a position near the center of the second circular disk 274b. The oxygen-containing gas inlet 70 is provided at substantially the central position of the cathode 32 of the electrolyte electrode assembly 36. Thus, as shown in FIG. 34, the air is supplied from the oxygen-containing gas inlet 70 to the cathode 32, and flows along the oxygen-containing gas channel 68 formed by the felt member 302, outwardly from substantially the central region to the outer circumferential region of the cathode 32.

Thus, in each of the electrolyte electrode assemblies 36, the fuel gas is supplied from substantially the central region to the outer circumferential region of the anode 34, and the air is supplied from substantially central region to the outer circumferential region of the cathode 32 for generating electricity. The fuel gas and the air consumed in the power generation are discharged as the exhaust gas from the outer circumferential region of each of the electrolyte electrode assemblies 36, and flows into the exhaust gas channel 97.

The invention claimed is:

1. A fuel cell separator stacked on an electrolyte electrode assembly in a stacking direction, said electrolyte electrode assembly including an anode, a cathode, and an electrolyte interposed between said anode and said cathode, the fuel cell separator comprising:
   a sandwiching section for sandwiching said electrolyte electrode assembly, a fuel gas channel for supplying a fuel gas along an electrode surface of said anode and an oxygen-containing gas channel for supplying an oxygen-containing gas along an electrode surface of said cathode being provided separately on said sandwiching section, said sandwiching section being configured such that the fuel gas and the oxygen-containing gas after consumption are discharged from an outer circumferential portion of said electrolyte electrode assembly;
   a bridge connected to said sandwiching section, a reactant gas supply channel for supplying the fuel gas to said fuel gas channel or supplying the oxygen-containing gas to said oxygen-containing gas channel being provided on said bridge; and
   a manifold connected to said bridge, a reactant gas supply passage for supplying the fuel gas or the oxygen-containing gas to said reactant gas supply channel extending through said manifold in the stacking direction,
   wherein a circumferential length R of said sandwiching section and a width H of said bridge satisfy a relationship of $0.03 \leq H/R \leq 0.20$.

2. The fuel cell separator according to claim 1, wherein the circumferential length R of said sandwiching section and a length L of said bridge satisfy a relationship of $0.01 \leq L/R \leq 0.55$.

3. The fuel cell separator according to claim 2, wherein the circumferential length R of said sandwiching section and an outer diameter D of said manifold satisfy a relationship of $0.06 \leq D/R \leq 0.32$.

4. The fuel cell separator according to claim 1, wherein said manifold is connected to a plurality of said sandwiching sections through a plurality of said bridges; and
   distances between the center of said manifold and reactant gas inlets provided at the centers of said sandwiching sections are the same.

5. A fuel cell separator stacked on an electrolyte electrode assembly in a stacking direction, said electrolyte electrode assembly including an anode, a cathode, and an electrolyte interposed between said anode and said cathode, the fuel cell separator comprising:
   a sandwiching section for sandwiching said electrolyte electrode assembly, a fuel gas channel for supplying a fuel gas along an electrode surface of said anode and an oxygen-containing gas channel for supplying an oxygen-containing gas along an electrode surface of said cathode being provided separately on said sandwiching section, said sandwiching section being configured such that the fuel gas and the oxygen-containing gas after consumption are discharged from an outer circumferential portion of said electrolyte electrode assembly;
   a bridge connected to said sandwiching section, a reactant gas supply channel for supplying the fuel gas to said fuel gas channel or supplying the oxygen-containing gas to said oxygen-containing gas channel being provided on said bridge; and
   a manifold connected to said bridge, a reactant gas supply passage for supplying the fuel gas or the oxygen-containing gas to said reactant gas supply channel extending through said manifold in the stacking direction,
   wherein a circumferential length R of said sandwiching section and a length L of said bridge satisfy a relationship of $0.01 \leq L/R \leq 0.55$.

6. The fuel cell separator according to claim 5, wherein the circumferential length R of said sandwiching section and an outer diameter D of said manifold satisfy a relationship of $0.06 \leq D/R \leq 0.32$.

7. The fuel cell separator according to claim 5, wherein said manifold is connected to a plurality of said sandwiching sections through a plurality of said bridges; and
   distances between the center of said manifold and reactant gas inlets provided at the centers of said sandwiching sections are the same.

8. A fuel cell separator stacked on an electrolyte electrode assembly in a stacking direction, said electrolyte electrode assembly including an anode, a cathode, and an electrolyte interposed between said anode and said cathode, the fuel cell separator comprising:
   a sandwiching section for sandwiching said electrolyte electrode assembly, a fuel gas channel for supplying a fuel gas along an electrode surface of said anode and an oxygen-containing gas channel for supplying an oxygen-containing gas along an electrode surface of said cathode being provided separately on said sandwiching section, said sandwiching section being configured such that the fuel gas and the oxygen-containing gas after consumption are discharged from an outer circumferential portion of said electrolyte electrode assembly;
   a bridge connected to said sandwiching section, a reactant gas supply channel for supplying the fuel gas to said fuel gas channel or supplying the oxygen-containing gas to said oxygen-containing gas channel being provided on said bridge; and
   a manifold connected to said bridge, a reactant gas supply passage for supplying the fuel gas or the oxygen-containing gas to said reactant gas supply channel extending through said manifold in the stacking direction,
   wherein a circumferential length R of said sandwiching section and an outer diameter D of said manifold satisfy a relationship of $0.06 \leq D/R \leq 0.32$.

9. The fuel cell separator according to claim 8, wherein the circumferential length R of said sandwiching section and a width H of said bridge satisfy a relationship of $0.03 \leq H/R \leq 0.20$.

10. The fuel cell separator according to claim 8, wherein said manifold is connected to a plurality of said sandwiching sections through a plurality of said bridges; and
    distances between the center of said manifold and reactant gas inlets provided at the center of said sandwiching sections are the same.

* * * * *